(12) United States Patent
Ippolito et al.

(10) Patent No.: US 8,134,249 B2
(45) Date of Patent: Mar. 13, 2012

(54) WIND SYSTEM FOR CONVERTING ENERGY THROUGH A VERTICAL-AXIS TURBINE ACTUATED BY MEANS OF KITES AND PROCESS FOR PRODUCING ELECTRIC ENERGY THROUGH SUCH SYSTEM

(76) Inventors: Massimo Ippolito, Berzano di San Pietro (IT); Franco Taddei, Sirtori (IT)

( * ) Notice: Subject to any disclaimer, the term of this patent is extended or adjusted under 35 U.S.C. 154(b) by 494 days.

(21) Appl. No.: 12/307,421

(22) PCT Filed: Jun. 13, 2007

(86) PCT No.: PCT/IT2007/000419
§ 371 (c)(1), (2), (4) Date: Jan. 5, 2009

(87) PCT Pub. No.: WO2008/004261
PCT Pub. Date: Jan. 10, 2008

(65) Prior Publication Data
US 2010/0013225 A1   Jan. 21, 2010

(30) Foreign Application Priority Data
Jul. 4, 2006  (IT) .............................. TO2006A0491

(51) Int. Cl.
*F03D 9/00* (2006.01)
(52) U.S. Cl. .......................... 290/55; 244/153 R; 290/44
(58) Field of Classification Search .................... 290/44, 290/55; 244/153 R, 33
See application file for complete search history.

(56) References Cited

U.S. PATENT DOCUMENTS

| | | | | |
|---|---|---|---|---|
| 6,254,034 | B1 * | 7/2001 | Carpenter | 244/153 R |
| 6,327,994 | B1 * | 12/2001 | Labrador | 114/382 |
| 6,523,781 | B2 * | 2/2003 | Ragner | 244/153 R |
| 6,616,402 | B2 * | 9/2003 | Selsam | 415/3.1 |
| 7,275,719 | B2 * | 10/2007 | Olson | 244/155 A |
| 2002/0040948 | A1 | 4/2002 | Ragner | |
| 2009/0278353 | A1 * | 11/2009 | Da Costa Duarte Pardal et al. | 290/44 |

FOREIGN PATENT DOCUMENTS

| | | |
|---|---|---|
| DE | 28 39 918 | 3/1980 |
| EP | 1 672 214 | 6/2006 |
| FR | 2 766 241 | 1/1999 |
| NL | 1017171 | 7/2002 |
| WO | 2004 044418 | 5/2004 |

OTHER PUBLICATIONS

"Small KiWiGen Carousel emulator", Kiwigen Emulator, http://www.kitewindgenerator.com/emulation.htm, XP-002457094, 2007, (English abstract only).

* cited by examiner

*Primary Examiner* — Michael Zarroli
(74) *Attorney, Agent, or Firm* — Oblon, Spivak, McClelland, Maier & Neustadt, L.L.P.

(57) ABSTRACT

A wind system for converting wind energy including at least one kite that can be driven from ground immersed in at least one wind current and a vertical-axis wind turbine placed at ground level. The wind turbine includes at least one arm connected through two ropes to the kite, the kite configured to be driven through the turbine to rotate the arm and convert wind energy into electric energy through at least one generator/motor system operating as a generator that co-operates with the turbine. The ropes are configured both to transmit mechanical energy from and to the kites, and to control the flight trajectory of the kites. A process produces electric energy through such a system.

19 Claims, 17 Drawing Sheets

WIND SYSTEM FOR CONVERTING ENERGY THROUGH A VERTICAL-AXIS TURBINE ACTUATED BY MEANS OF KITES AND PROCESS FOR PRODUCING ELECTRIC ENERGY THROUGH SUCH SYSTEM

The present invention refers to an wind system for converting energy through a vertical-axis turbine actuated by means of power winged profiles (generically designated as "kites"). The present invention further refers to a process for producing electric energy through such system.

In the past, the problem of producing energy at low costs by exploiting renewable energy sources has been already dealt with; in particular, in some prior patents mentioned below, wind energy converting processes have been proposed, together with several devices that subtract wind energy to the wind through kites.

In particular, U.S. Pat. No. 4,124,182 discloses a device equipped with "parakites" (or "modified parachutes") for capturing wind energy and converting it into the rotary motion of a shaft that actuates a generator. This device is characterised by a pair of "trains of parakites" in which all kites are arranged in series. Each train is equipped with a power rope. Such cables are not long enough to allow the trains of parakites to reach heights in which stronger and more uniform winds blow with respect to those that blow at earth surface level. Every train is constrained through the corresponding power rope to a drum or a winch whose rotation direction can be alternated in order to rewind the ropes, or allow unwinding them due to the wind current traction effect. Every train of parakites is equipped with a second rope, called "cap rope", connected to each train kite and through which it is possible to selectively collapse the parakites to make the rewinding procedure easier. Through a reducer, the rotary motion of each winch is transferred to a generator that, when actuated, produces electricity. There is a single system of pulleys that, through clutches and rotary gears, makes one train of parakites recovered while the other one ascends. The captured wind energy is then converted into mechanical energy, that is partly immediately spent for recovering the train of parakites whose cap has been closed, and partly converted into electric energy. Through an aerostatic balloon constrained to each train and inflated and deflated upon every operating cycle, the parakites are kept at a desired height and the caps are kept with a fixed orientation.

CN-A-1,052,723 discloses a wind current generator equipped with a pair of kites through which the traction exerted by wind currents is converted, through high-strength ropes, into the rotation of a drum placed at ground level. The winch actuates an hydraulic motor through which current production occurs.

GB-A-2,317,422 describes a device equipped with multiple kites that, due to the wind action effect, rotate a vertical shaft connected to a generator for producing current. The kites are pushed by the wind running on a circular path in the horizontal plane. Every kite is equipped with a device able to modify the wind starting angle in order to guarantee flight continuity.

U.S. Pat. No. 6,072,245 describes a device for exploiting wind energy composed of multiple kites connected to ropes forming a loop. The kites are driven in order to alternate an ascending path to a descending path, determining a rotary ring motion always along the same direction. Every kite is connected to a power rope for transmitting mechanical energy and to a system of driving ropes for adjusting the wind starting angle of each kite. The power rope generates the rotation of pulleys through which electricity production occurs. The driving ropes are used in order to make each kite assume a position that, in its ascending, path, allows the kite to be dragged upwards by the wind, and a second position in its descending path so that the kite is subjected to a lower wind thrust.

U.S. Pat. No. 6,254,034 describes a device equipped with a kite ("tethered aircraft") pushed by wind currents at a controlled speed, in order to exploit the wind energy. The kite is connected through a rope to a winch that actuates a generator for producing electric energy. On board the kite, a driving system is assembled that detects and modifies the wind starting angle and modifies the captured wind front area. Such system is controlled from ground by an operator, that reads on a display data transmitted by suitable sensors, or automatically through a remote control system. The kite is driven in order to downwind ascend with a high starting angle. After having ended the ascension, the starting angle is reduced and the kite glides in order to get upwind. The kite is recovered, glides again downwind and the cycle is repeated.

NL-A-1017171C describes a device similar to the previous, above-described device in which, however, the manual driving mode is not provided and in which the kite recovery occurs by inclining the kite as a flag, in order to minimise the wind thrust when rewinding the ropes.

U.S. Pat. No. 6,523,781 describes a device composed of a kite ("airfoil kite") through which the wind energy can be captured, having an inlet edge, an outlet edge and two side edges. Such kite is driven through a mechanism supported by the kite itself. This device is equipped with ropes connected to the kite edges and the kite is driven by modifying, through these ropes, the pitch angle. The driving mechanism is supplied through electric cables placed inside a power rope that connects the kite to a winch that actuates a generator for producing electricity. The kite ascends pushed by the wind exploiting the lift force and running on a path that is almost perpendicular to the wind speed direction. After having ended the ascension, the kite is recovered and afterwards driven in order to capture again the wind.

U.S. Pat. No. 2005046197 describes a device equipped with a kite for exploiting the wind energy that generates electricity by actuating, by means of ropes, a winch connected to a generator. The kite is driven through additional ropes through which the wind starting angle can be modified. The kite ascends with a high starting angle. After having ended the ascension, the starting angle is minimised and the kite is recovered so that the cycle starts again.

As can be noted by analysing the existing prior art, the known wind systems equipped with kites have the following common features:

the kites are equipped both with power ropes and with driving ropes: this means that the load of ropes through which electricity is produced is not transmitted to kite guiding mechanisms, but to other components of the wind system, through ropes suitably used for performing such function. The lack of use of power ropes to drive the kites makes the wind system structure complicated, with all following disadvantages;

the kites are driven through mechanisms that are directly installed on the kites or through at least four auxiliary (driving) ropes. Unwinding and rewinding of these ropes occur by means of winches used only for such purpose, placed at ground level or suspended from the ground (namely supported by the kites themselves). In case of use of driving ropes, the placement of winches at ground level allows not consuming part of the energy subtracted to wind currents to replace the weight of the driving mechanisms themselves;

the kites are driven in order to generate electricity by ascending through exploitation of the drag force (namely the wind thrust component parallel to the wind speed). Such step is followed by the recovery of kites by placing the kite as a flag, in order to minimise the braking effect. In a limited number of wind systems, it has been though of exploiting the lift force (namely the wind thrust component perpendicular to the wind speed) in addition to the drag force in order to lift the kites. The advantage deriving from the use of this latter driving mode with respect to the previous one consists in that, in order to produce electricity, not only the kite resistance, but also the kite lift are exploited. Anyway, in both modes, the intermittence operating cycle (alternate between an ascending step and a recovery step) implies that the dragging effect of kites through which the production of electricity occurs is present only during half of the path run by the kites (it is in fact absent during the recovery);

the energy conversion occurs by imposing, through the power ropes, the rotation of winches connected to generators, possibly by interposing reducers. This does not allow producing energy with continuity during an operating cycle since the kite recovery occurs by actuating such winches through motors. In such a way, the electricity generation is interrupted, together with the consumption of part of the previously produced energy. The continuous current delivery to external users is made possible through the use of accumulators;

attention has been focused exclusively on the production of electricity through a cyclic process. The choice of the path along which the flying kites run in order to maximise the rate of converted energy is almost completely neglected;

problems related to the control system of a kite or a train composed of many serially connected kites are dealt with in detail in an extremely limited number of projects and searches. This is due also to the fact that current searches are mainly focused on increasing productivity of already existing systems instead of on the development of new energy producing systems.

In order to partially solve the above problems, EP-A-1 672 214 in the name of Sequoia Automation S.R.L. instead discloses a system for converting the kinetic energy of wind currents into electric energy through the predictive and adaptive control of the flight of kites connected to a system of the "carousel" type using a vertical-axis turbine.

Object of the present invention is solving the above prior art problems by providing a wind system for converting energy by means of kites in which energy conversion occurs through at least one generator actuated by the rotation of arms of a vertical-axis turbine and in which each arm is connected through a single pair of ropes to at least one kite that, pushed by the wind and suitably driven, generates at turbine level a twisting moment due to which the arms are rotated.

Another object of the present invention is providing a wind system in which the kites that compose the wind system are driven through the same ropes through which energy is transferred to the vertical-axis turbine arms.

A further object of the present invention is providing a wind system in which the kites are driven by a smart control system that actuates motors connected to winches, possibly by interposing reducers, placed at ground level and whose function consists both in driving the kites by unwinding and rewinding the ropes wound around them and in supporting the rope load for converting energy.

Another object of the present invention is providing a wind system in which the kites are driven by smart control system that, upon every operating cycle, makes the kites perform the optimum path in order to optimise the wind energy that can be subtracted to the wind.

An object of the present invention moreover is providing a wind system in which the kites are driven in order to allow converting the wind energy by mainly exploiting the lift force and in order to perform a path during which the dragging effect is present almost for the whole length of the operating cycle.

Moreover, an object of the present invention is providing a process for producing electric energy through a wind system according to the present invention that can be actuated more efficiently with respect to what is proposed by the prior art.

The above and other objects and advantages of the invention, as will appear from the following description, are obtained with a wind system for converting energy through a vertical-axis turbine actuated by means of kites.

Moreover, the above and other objects and advantages of the invention are obtained with a process for producing electric energy through a system according to the present invention.

The present invention will be better described by some preferred embodiments thereof, provided as a non-limiting example, with reference to the enclosed drawings, in which.

Figure 1:
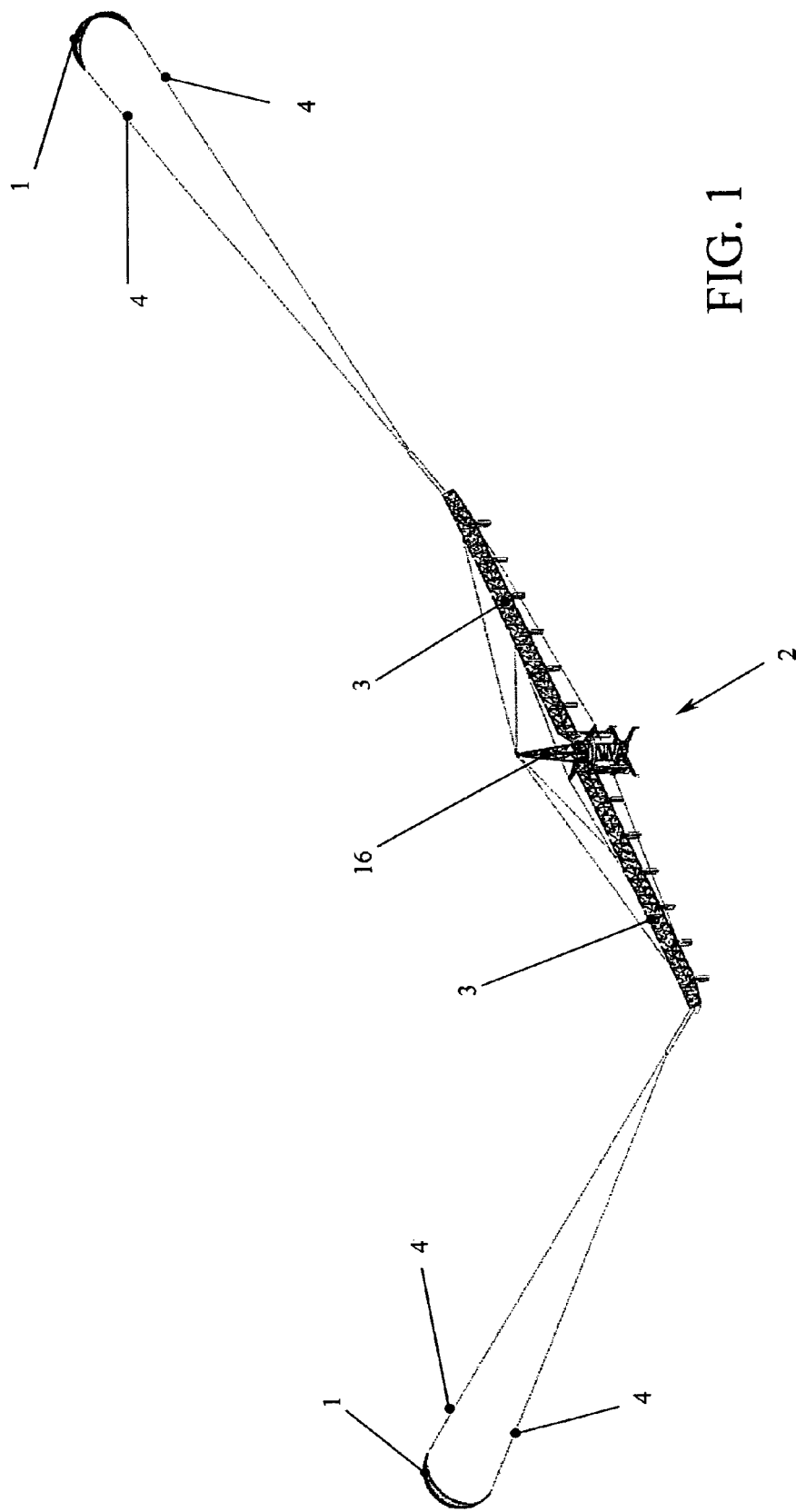
FIG. 1 shows a perspective view of a preferred embodiment of the wind system according to the present invention.
Figure 2:
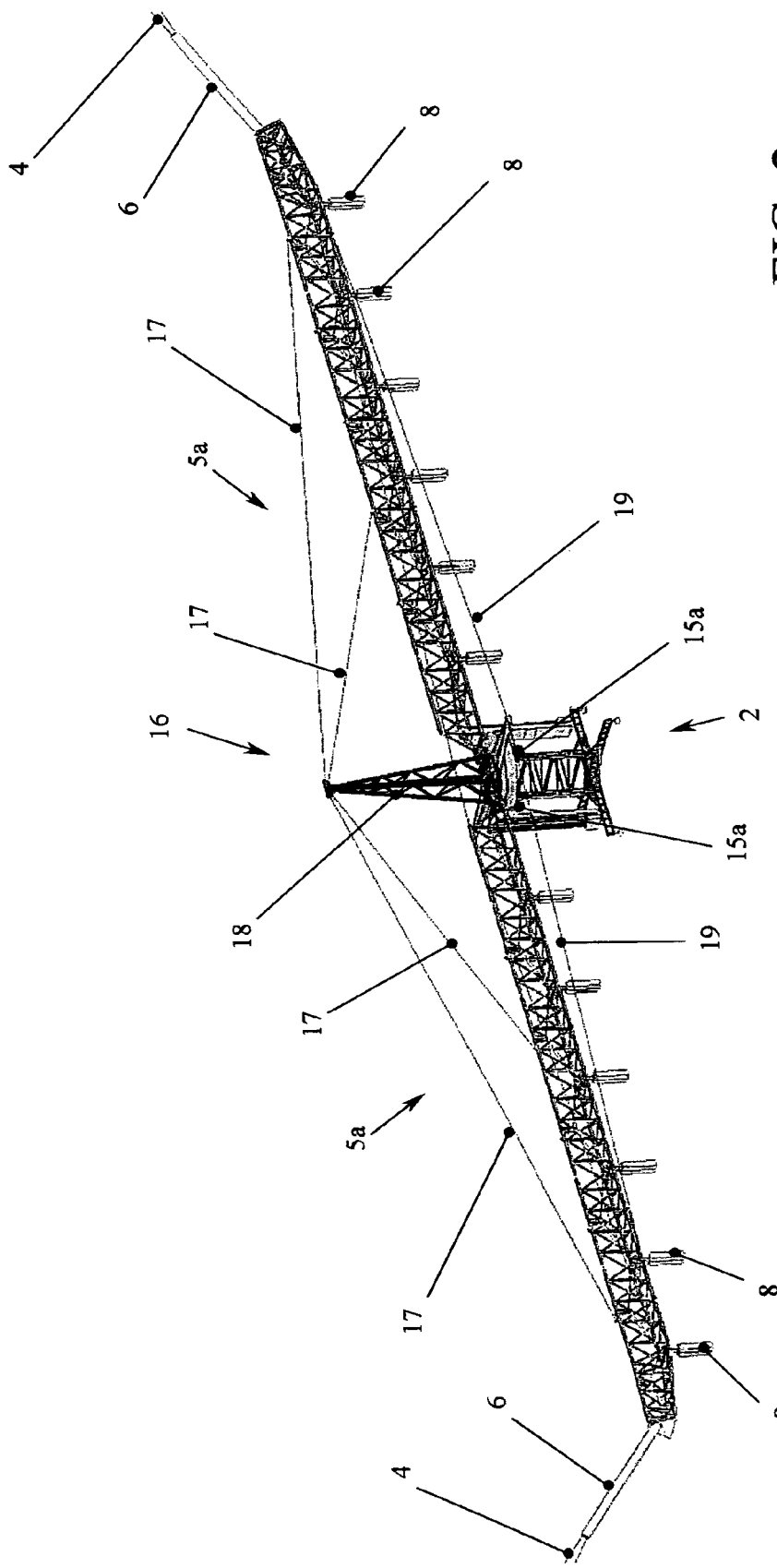
FIG. 2 shows an enlarged perspective view of the wind system of FIG. 1.

As can be seen in more detail in the following description, in general the wind system according to the present invention is composed of a vertical-axis turbine adapted to convert into electric energy the wind energy captured by a wind current, preferably at troposphere level (that extends up to about 15 km from the earth surface), through kites immersed into such current and connected to arms of such turbines, each one of such kites being driven by means of servo-assisted winches that are autonomously driven by a smart control system, distinguishing by the current art above all for the modes with which the kites are driven for the path run when flying by such kites in order to maximise the rate of converted energy and for the turbine architecture with vertical axis.

With reference then to the Figures, it is possible to note that the wind system for converting energy according to the present invention comprises at least one kite 1 immersed into a wind current W and connected through two ropes 4 to at least one arm 3 of a vertical-axis wind turbine 2 placed at ground level, such kite 1 being adapted to be driven through such turbine 2 to rotate the arm 3 to which it is connected and to perform the conversion of wind energy into electric energy through at least one generator/motor system 15a or 15b operating as generator and co-operating with the turbine 2; such two ropes 4 being moreover adapted both to transmit mechanical energy from and to the kite 1 for actuating the turbine 2 and to control the flight trajectory of the kite 1 itself.

It can be noted that the example embodiment of the wind system according to the present invention shown in the Figures provides for the use of a vertical-axis wind turbine 2 equipped with two arms 3 next to the end of each one of which a respective kite 1 is connected; it is however wholly clear that turbines 2 with a different number of arms 3 and kites 1 connected thereto can be used without departing from the scope of the present invention. In particular, it is possible to provide that, to each arm 3 of the turbine 2, a plurality of kites 1 are connected, mutually arranged in series (train of kites 1), in order to sum their pull on the ropes 4. Every train of kites 1 is connected to the turbine 2 through a single system of ropes 4, and therefore the operating principle of the device does not depend on the number of serially connected kites 1. The advantage deriving from the use of many kites 1 consists in increasing the wind front surface intercepted by such kites and consequently in increasing the moment actuating the turbine 2 and the electric energy that can be generated upon every operating cycle, as will be described below in more detail.

The kites 1 are immersed into the wind currents to be captured and are realised by weaving fibres commonly employed when manufacturing specific sails for certain sports activities, such as for example surf and carts. The kites 1 can be completely flexible or semi-rigid. Their semi-rigidity is obtained due to the use of an extremely lightweight frame, due to the effect of which the kite can assume, for example, a similar shape to the one of rigid aliant wings. The recourse to semi-rigidity ensures a high improvement of performances due to the higher driving easiness. A fundamental specification that characterises the kites is the global surface area. Due to recent aerodynamic studies, kites are available on the market that are able to satisfy certain needs in terms of control and drivability. By suitably driving a kite, it is possible to modulate the energy transfer from the wind. This is fundamental since the kites 1 must be guided so that the traction exerted by means of wind currents is maximum and at the same time does not impair the rotation of the arms 3 of the turbine 2. Next to each arm 3, the kites 1 must namely be driven in order to produce a moment at turbine 2 level that is always kept in the same rotation direction or is possibly cancelled, without therefore being opposed to the current generation. Such result is reached by suitably modulating the energy transfer from the wind, as will be seen afterwards in more detail.

The wind system according to the present invention further comprises a smart control system operating on the turbine 2 through which the flight of kites 1 is automatically commanded and a supply system co-operating with such smart control system to manage accumulation and delivery of electric energy.

The smart control system co-operates with a set of sensors with autonomous supply placed on the kites 1 that send information, preferably in wireless mode, to the ground components of the smart system itself. The smart control system integrates these pieces of information with other information coming from a set of ground sensors (for example the rope load value determined by reading the motor torques mentioned below) and performs processings for automatically driving the kites 1 during the wind system operation.

Figure 7:
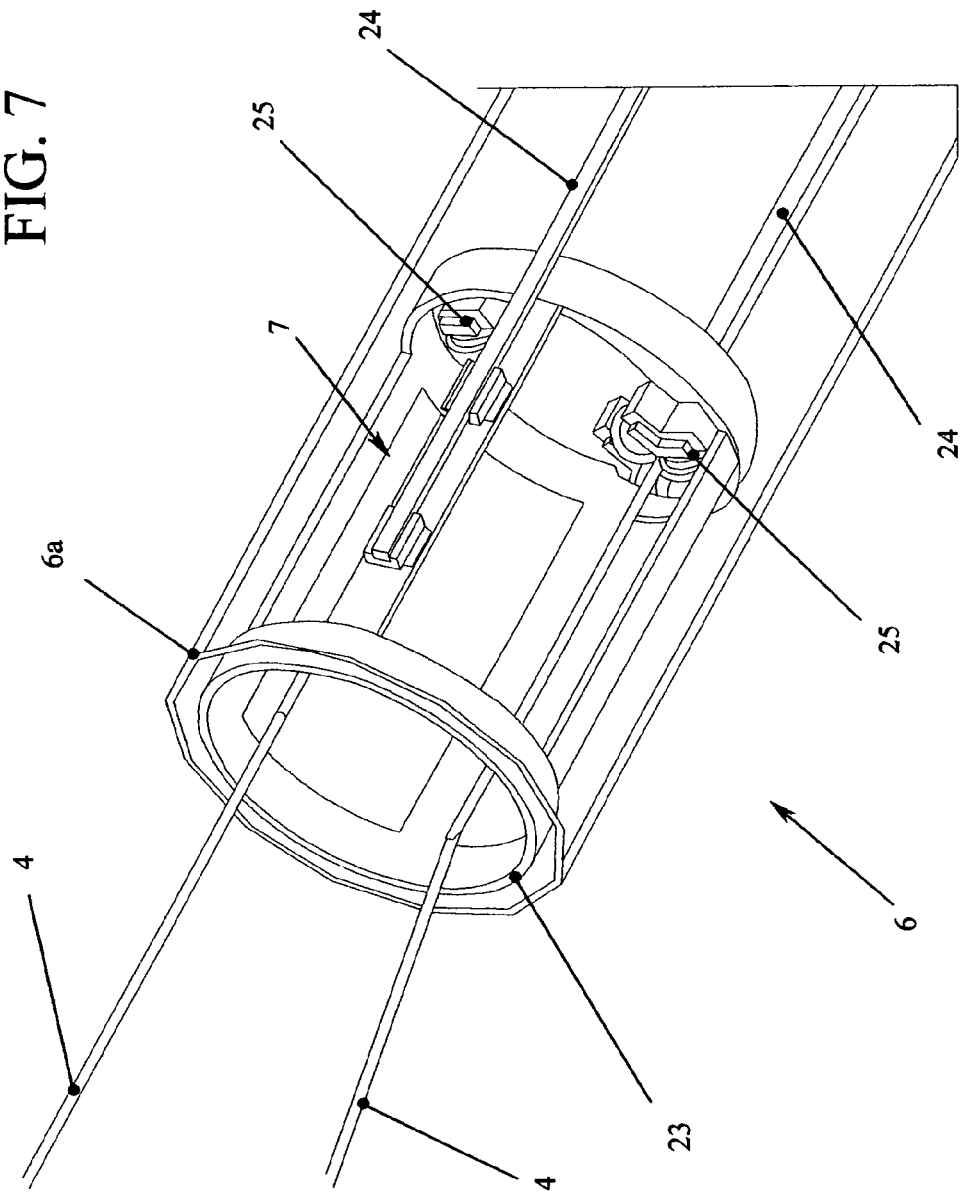
FIG. 7 shows a perspective view of a preferred embodiment of another component of the wind system according to the present invention.

With reference to FIG. 2 to 6, it is possible to note that each arm 3 of the vertical-axis wind turbine 2 is supported by a supporting system 5a or 5b. At the end of each arm 3, a recovering device 6 of the kite 1 is further provided, integrated by a system 7 for recovering and expelling the kite 1, like the one shown in FIG. 7. The ropes 4 run along each arm 3 towards the turbine 2 centre driven by a transmission system equipped with at least one tensioning system 8 of the ropes 4. Next to the turbine 2 centre, each arm 3 is equipped with an energy accumulating system 9 for compensating sudden load variations, a winding and unwinding system 10 of the ropes 4 characterised by a pair of first winches 11 for driving the kites 1, and a storing system 12 for the ropes composed of a pair of second winches 13. Each second winch 13 of the storing system is equipped with a guiding module 14 that forces the rope 4 to an ordered winding on the respective second winch 13. The rotation of the arms 3 of the turbine 2 actuates, by interposing reducers, the generators/motors 15a or 15b depending on energy converting generators.

The kites 1 are driven by unwinding and rewinding the ropes 4 on their respective first winches 11. The ropes 4 are then the connecting and transmitting element of the force between kites 1 and arms 3 of the turbine 2. When the kites 1 are lifted by the wind, they determine the rotation of the arms 3 of the turbine 2 and, consequently, the converting energy through the generators/motors 15a or 15b depending on generators. Obviously, the length and diameter of each rope 4 depend on wind and safety conditions in which one has to operate. The arms 3 are also used upon starting the wind system in order to make the kite 1 ascension easier. At the end of each arm 3, in fact, a recovering device 6 is provided that recovers the kite 1 when the wind system is not operating. The launch of the kite 1 requires at least the presence of a light breeze at ground level. If the wind is scarce at low heights, the generators/motors 15a or 15b are actuated depending on motors to rotate the arms 3, which convert the motive torque into the breeze that allows the kites 1 to ascend.

The structure of each arm 3 can be, for example, as a grid, like the common lifting plants (the "cranes") used in the building sector. Such structure in fact satisfies the necessary lightness requirement in order to optimise the converting energy.

Next to the turbine 2 centre, the arms 3 are secured to a rotating shaft 16 relatively with respect to the fixed part of the turbine 2 and interfaced with this latter one through a series of revolving bodies.

The number of arms 3 with which the wind turbine 2 must be equipped depends on the power that has to be delivered.

The supporting system 5a or 5b of the arms 3 is the component of the turbine 2 that contributes to support the weight of each arm 3 and the pull of the ropes 4 in order to avoid that efforts inside the structure produce such distortions as to impair the wind system operation.

In order to realise the supporting system 5a or 5b, preferably two arrangements can be adopted. The first arrangement 5a shown in FIG. 2 consists in supporting the arms 3 of the turbine 2 by using a first and a second system of tie-rods. The first system is composed of first tie-rods 17 constrained at one of their ends to the arms, at the other end thereof to a single vertical structure 18 placed on the turbine 2 centre and rotating with the arms 3. The second system is placed in the rotation plane of the turbine 2 and is composed of second tie-rods 19 constrained at one end to the arms 3, at the other end to the central rotary shaft 16 to which the arms 3 are connected. While the first system of tie-rods supports the weight of the arms 3, the second system contributes to counteract the ropes 4 pull during the wind system operation. The technical knowledges necessary for implementing such arrangement are the same ones used for realising the tensioned structures.

Figure 3:
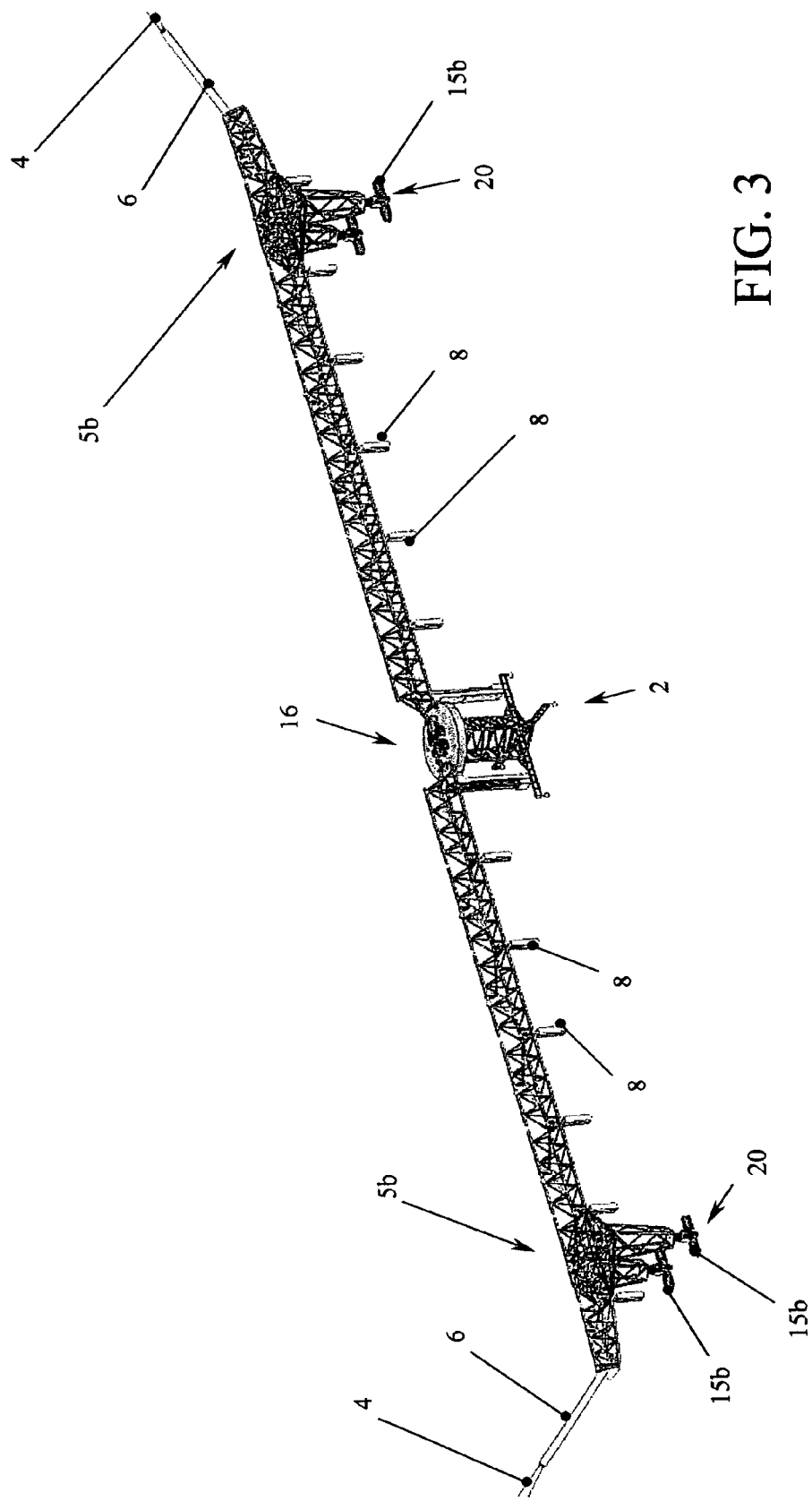
FIG. 3 shows a perspective view of a preferred variation of the wind system according to the present invention.
Figure 4:
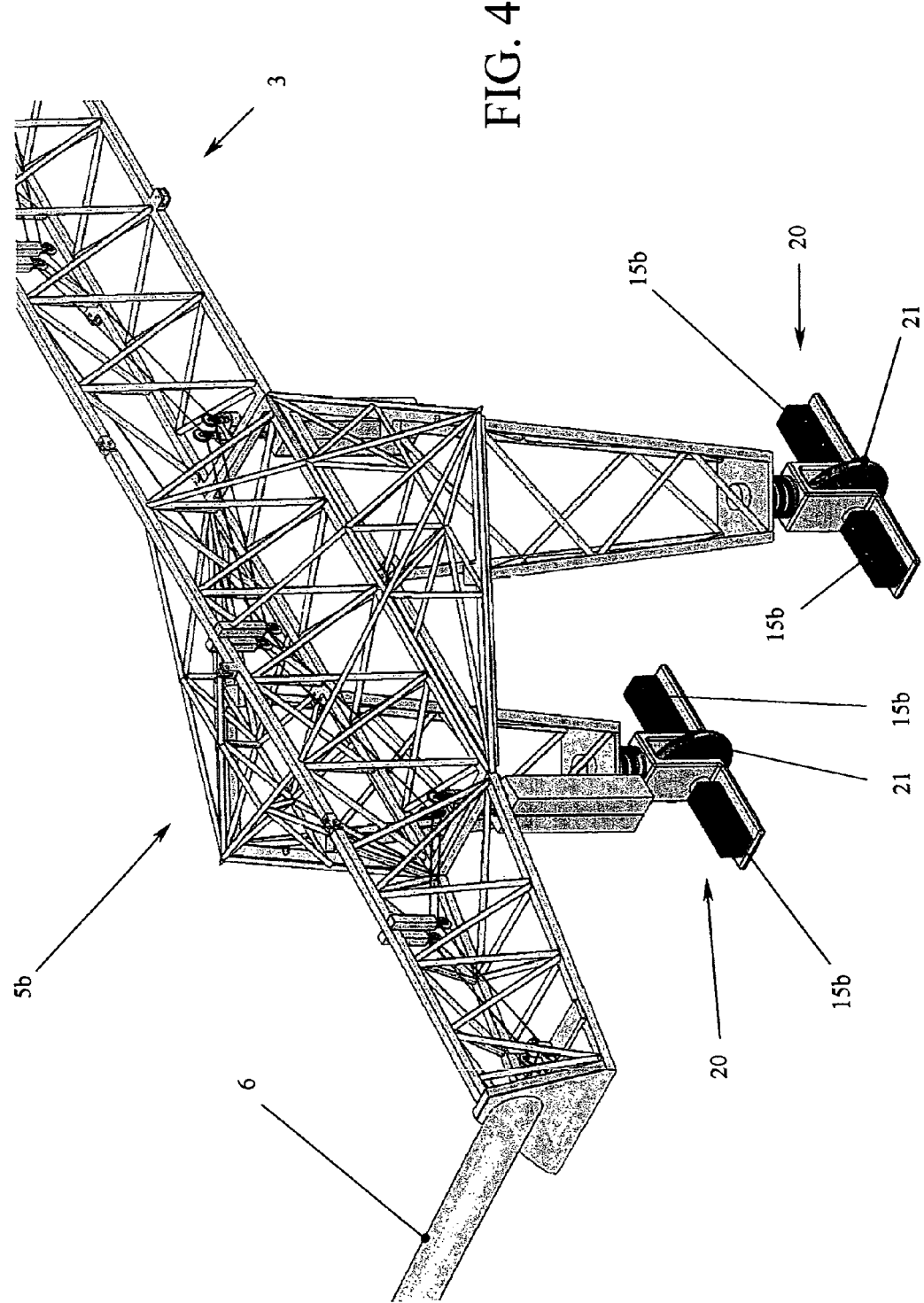
FIG. 4 shows an enlarged perspective view of a component of the wind system of FIG. 3.
Figure 5:
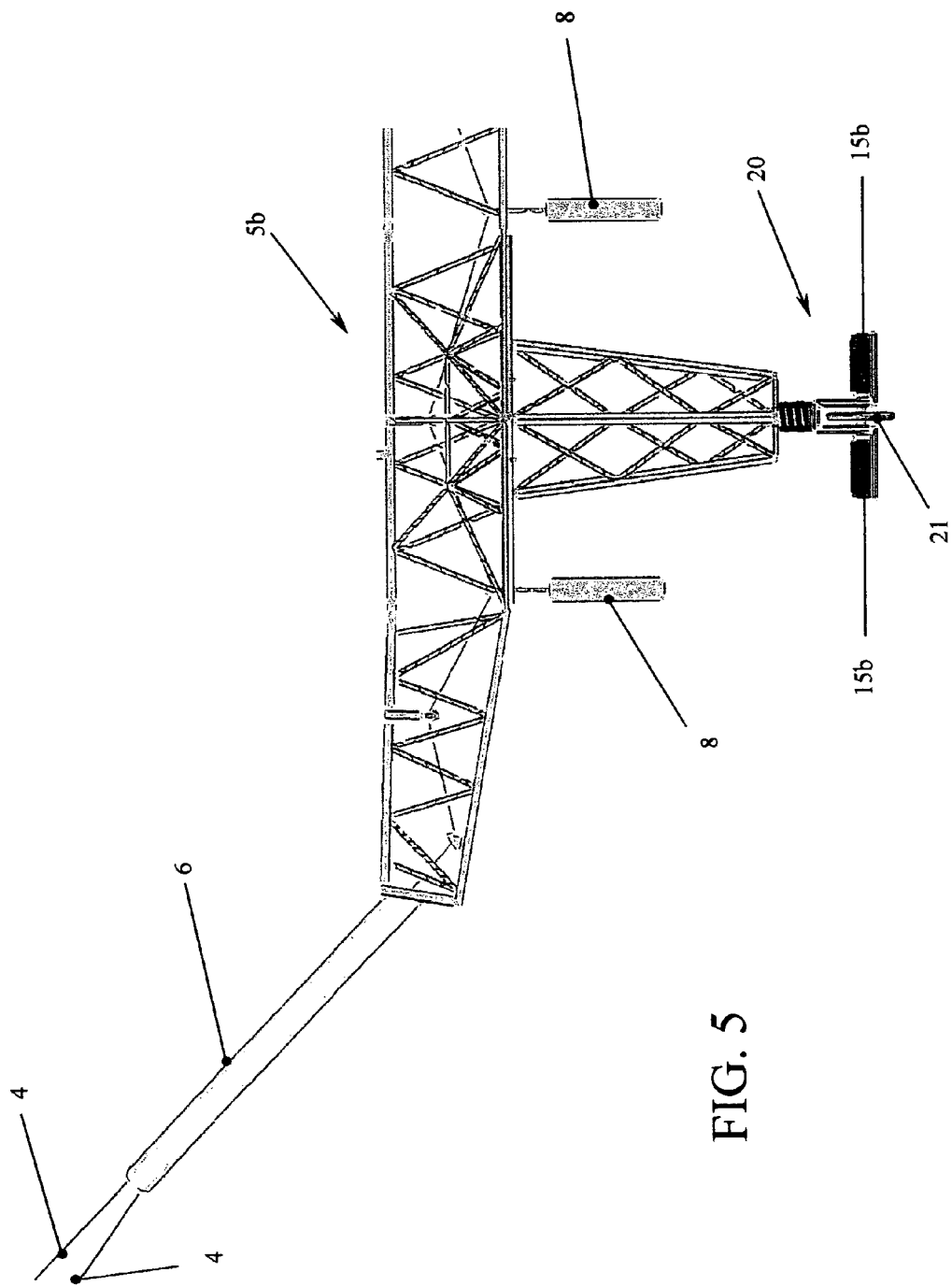
FIG. 5 shows a side view of the component of FIG. 4.
Figure 6:
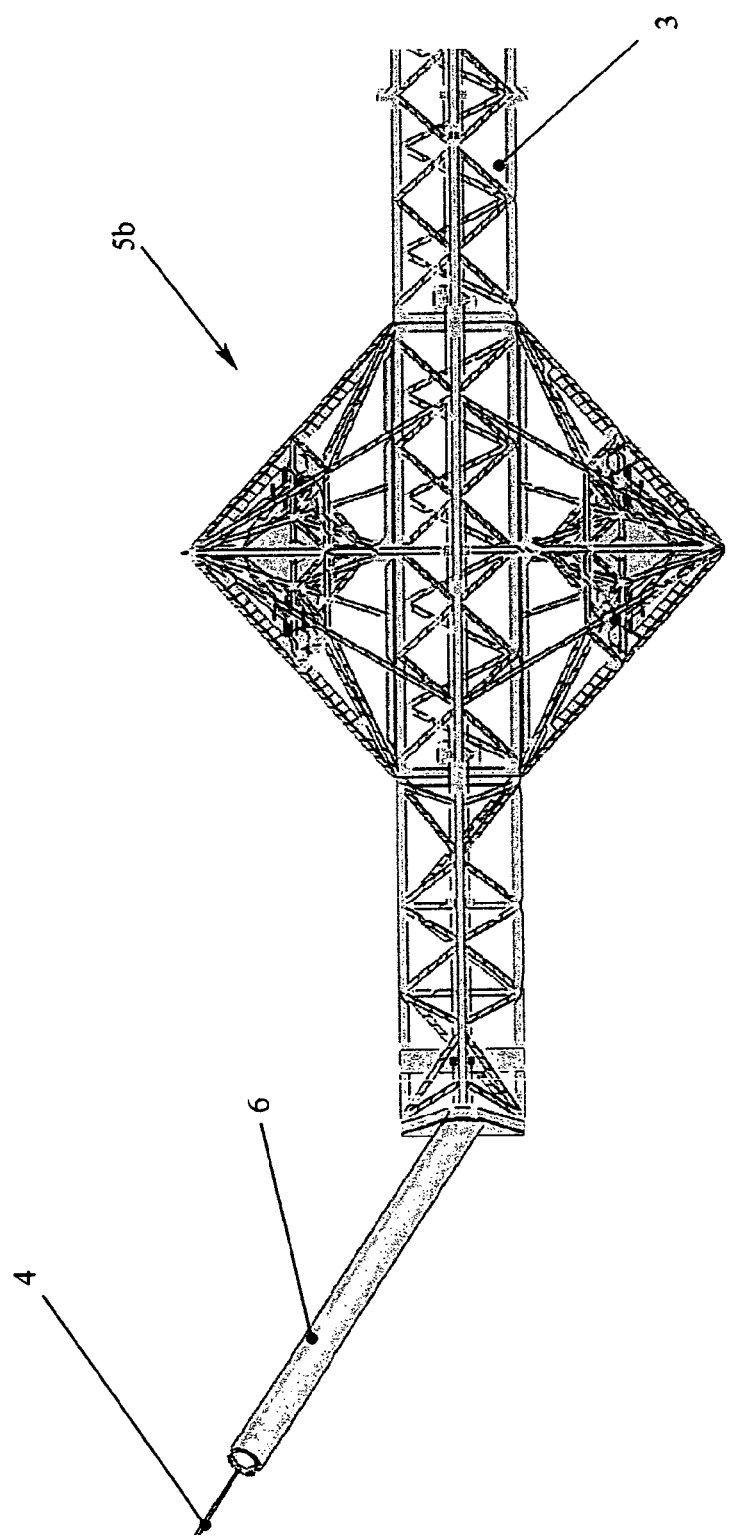
FIG. 6 shows a top view of the component of FIGS. 3 and 4.

The second arrangement 5b, like the one shown in FIGS. 3 and 4, consists in abutting the arms 3 of the turbine 2 on the ground through dampening trolleys 20 that operate as elastic support. Every supporting system 5b according to the second arrangement is therefore equipped, for example, with a pair of aligned wheels 21, with rotation axes passing by the rotation centre of the turbine 2 in order to generate exclusively tangential forces during the wind system operation. The interfacing between trolley 20 and arm 3 of the turbine 2 is performed through elastic means made, for example, as a spring coupled in parallel with a dampener 22. If the second arrangement is adopted, the turbine 2 must be equipped with a supporting system 5b next to each arm 3.

The recovering device 6 instead is the component of the wind turbine 2 used for recovering the kites 1 at rest. Each recovering device 6 comprises at least one cylindrical pipe 6a placed at the end of the respective arm 3 and suitably inclined in order to minimise the resistance opposed to the ropes 4 during the wind system operation. In particular, supposing that the rotation direction of the turbine 2 is always the same, each recovering device 6 is upwards inclined with respect to the horizontal plane (as shown, for example, in FIG. 5), and with respect to the vertical plane in such a way as to accompany the ropes 4 towards the kites 1 (as shown, for example, in FIG. 6). The outlet edge of the cylindrical pipe 6a of the recovering device 6 is preferably rounded in order to make the passage of the kite 1 easier during its recovery and launch. Preferably arranged inside each cylindrical pipe 6a, the arm 3 is equipped with a system 7 for recovering and expelling the kite 1 and accompanying the ropes 4. Obviously, the wind turbine 2 can be equipped with a recovering device 6 next to each arm 3.

The recovering and expelling system 7 of the kites 1 is the component of the wind turbine 2 through which the recovery and launch of the kite 1 occur respectively upon stopping and starting the wind system. Each of these recovering and expelling systems 7 is equipped, for example, with at least one trolley 23 constrained to two rails 24 that compel it to slide inside the corresponding cylindrical pipe 6a of the recovering device 6 and in parallel with the axis of such device. A pair of pulleys 25 for letting the ropes 4 out is assembled on the trolley 23. Both during the wind system operation and at rest, the trolley 23 is at its end-of-stroke. In particular, under working conditions, the trolley 23 is at the outside end of the recovering device 6; under rest conditions, the trolley 23 is downstream of the same element. The trolley 23 is actuated, for example, by at least one belt, preferably of the toothed type, driven by a motoreducer (not shown). Such dragging occurs when starting and stopping the wind system for recovering and expelling the kite 1. Upon recovering the kite 1, when the kite 1 is next to the arm 3 of the turbine 2, one of the two ropes 4 is pulled in order to incline the kite 1 arranging it in parallel with the recovering device 6 axis and favouring its entry into such element. The motoreducer connected to the hypothetical toothed belts is actuated and the trolley 23 descends into the recovering device 6, allowing the progressive recovery of the kite 1.

Upon expelling a kite 1 or a train of kites 1, it can be provided to actuate an artificial wind thrust device (not shown) that, for example, creates an artificial air flow that pushes the kite 1 outwards. Also in such case, the trolley 23, dragged by the belts, follows the kite 1 in its motion inside the recovering device 6. The wind turbine 2 can be equipped with a recovering and expelling system 7 of the kite 1 next to each recovering device 6.

Figure 8:
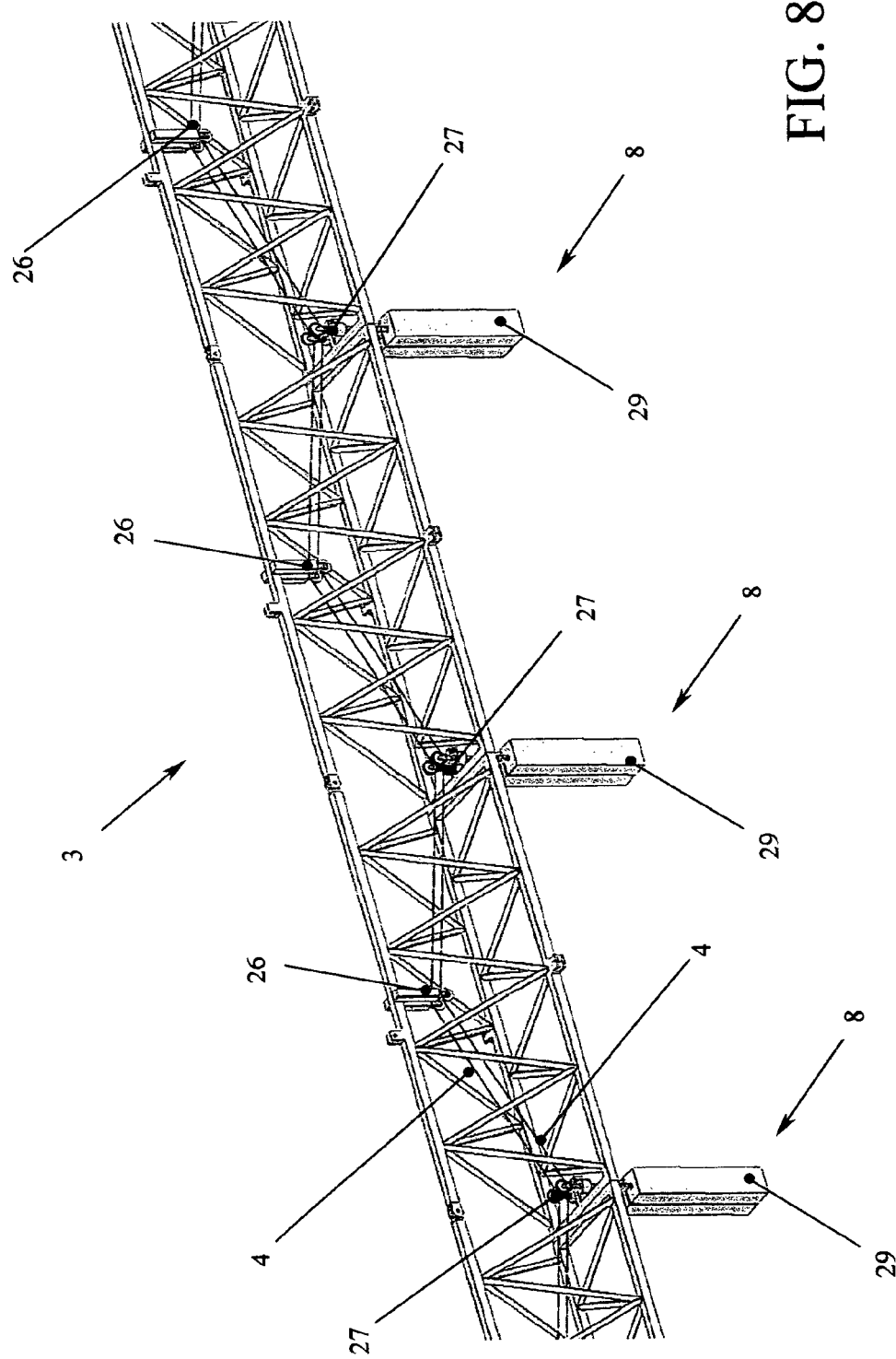
FIG. 8 shows a perspective view of a preferred embodiment of another component of the wind system according to the present invention.

The transmission system is the component of the turbine 2 that guides the ropes 4 between the recovering device 6 of the kites 1 and the energy accumulating system 9. In a preferred embodiment thereof shown in FIG. 8, the transmission system comprises pulleys assembled on the arms 3 of the turbine 2. The pulleys rotate around pins and are inserted between two faces connected next to the pins and the head. Each arm 3 of the turbine 1 is equipped with a transmission system in which there are two sets of pulleys, one for each of the two ropes 4 with which a kite 1 is driven. Such pulleys are alternatively arranged with their head oriented upwards and downwards. This makes the rope 4 appear as broken lines, along the arms 3 of the turbine 2. The pulleys in each transmission system can be divided into four categories:

first pulleys 25 assembled on the slider of the recovering and expelling system of the kite 1;

second pulleys 26 secured and assembled directly on the arms 3 of the turbine 2;

third pulleys 27 making part of the tensioning systems 8 of the ropes 4;

fourth pulleys 28 assembled on sliders of the guiding modules 14 of the ropes 4 (one for each slider). The wind turbine 2 can be equipped with a transmission system for each arm 3 and the global number of pulleys that compose a transmission system obviously depends on the length of the arms 3.

The tensioning and dampening system 8 of the ropes 4 is the component of the wind turbine 2 that keeps the ropes 4 tensioned along the arms 3 of the turbine 2 also under rest conditions and contributes to dampen sudden load variations that the ropes 4 are not able to absorb. In a possible embodiment thereof shown in particular in FIG. 8, the tensioning system 8 is composed of at least one pair of third pulleys 27 connected to at least one dampened counterweight 29 lifted from the ground and able to vertically translate constrained by a suitable guide. On each of the two third pulleys 27, one of the two ropes 4 is wound, with which a single kite 1 is driven, so that it is the ropes 4 tension that keeps the counterweight 29 lifted. Due to the force of gravity effect, the counterweight 29 tends to drag towards the ground the pair of ropes 4 generating a further load thereon. The effect is double since firstly the ropes 4 are always kept tensioned also when the wind system is at rest; secondly, such tensioning systems 8 contribute to dampen the sudden load variations of a certain amount.

When a wind stroke occurs, the sudden load increase is partly dampened by elongating the ropes 4 and partly by lifting the counterweights of the tensioning systems 8. Vice versa, if the load decreases, the ropes 4 are contracted and the counterweights 29 are lowered, partly compensating the possible delay with which the smart control system intervenes in order to solve the tension decrease. It is important that the pair of third pulleys 27 of each tensioning system 8 are connected to a single counterweight 29. If every pulley 27 is constrained to a different counterweight, the drivability of the kites 1 by the smart control system would be impaired. In order to drive a train of kites 1, the control system in fact operates on the relative difference of the lengths of the pair of ropes 4. If the pulleys 27 of each tensioning system 8 were connected to different counterweights, such relative difference would not exclusively depend any more on the smart control system, but also on the lowering of a counterweight co-operating with a rope 4 with respect to another counterweight co-operating with the other rope 4 of the same pair of ropes 4.

Figure 9:
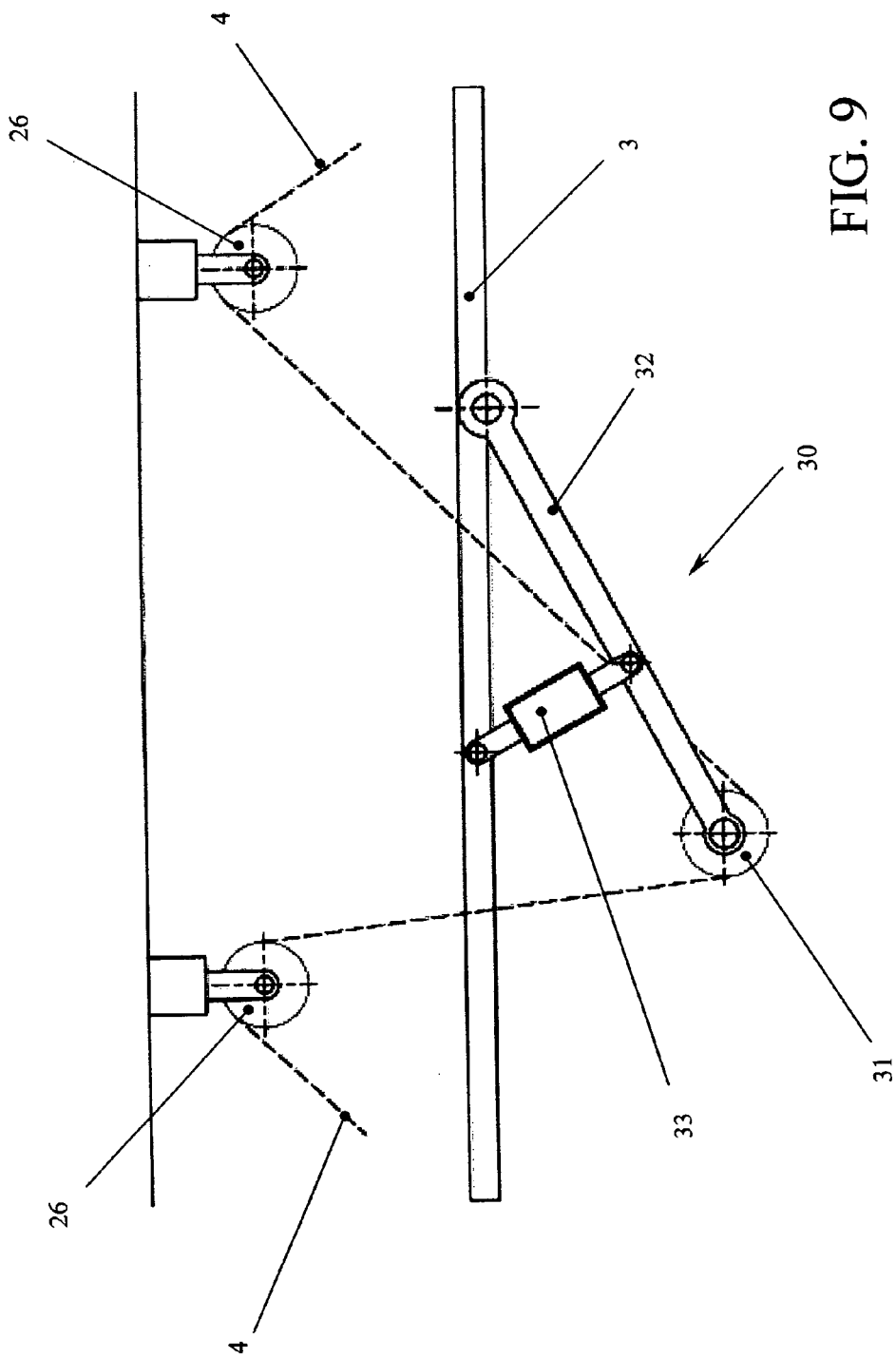
FIG. 9 shows a side schematic view of a preferred variation of the component of FIG. 8.

In an alternative embodiment thereof shown in particular in FIG. 9, the tensioning and dampening system 8 is equipped with at least one device 30 comprising a pair of fifth pulleys 31 constrained at the end of a rod 32 hinged next to the other end thereof to the arm 3 of the wind turbine 2. Such rod 32 co-operates with the arm 3 of the turbine 2 by interposing elastic means, preferably made as at least one dampened spring 33, compressed due to the effect of the ropes 4 pull. Similarly to what is described for the system 8 equipped with the counterweight 29, this variation of the system 8 keeps the ropes 4 tensioned and compensates for sudden load variations due to the effect of the elongation e of the spring 33 compression. The wind turbine 2 can be equipped with a number of tensioning systems 8 for each arm 3 that depends on their length.

Figure 10:
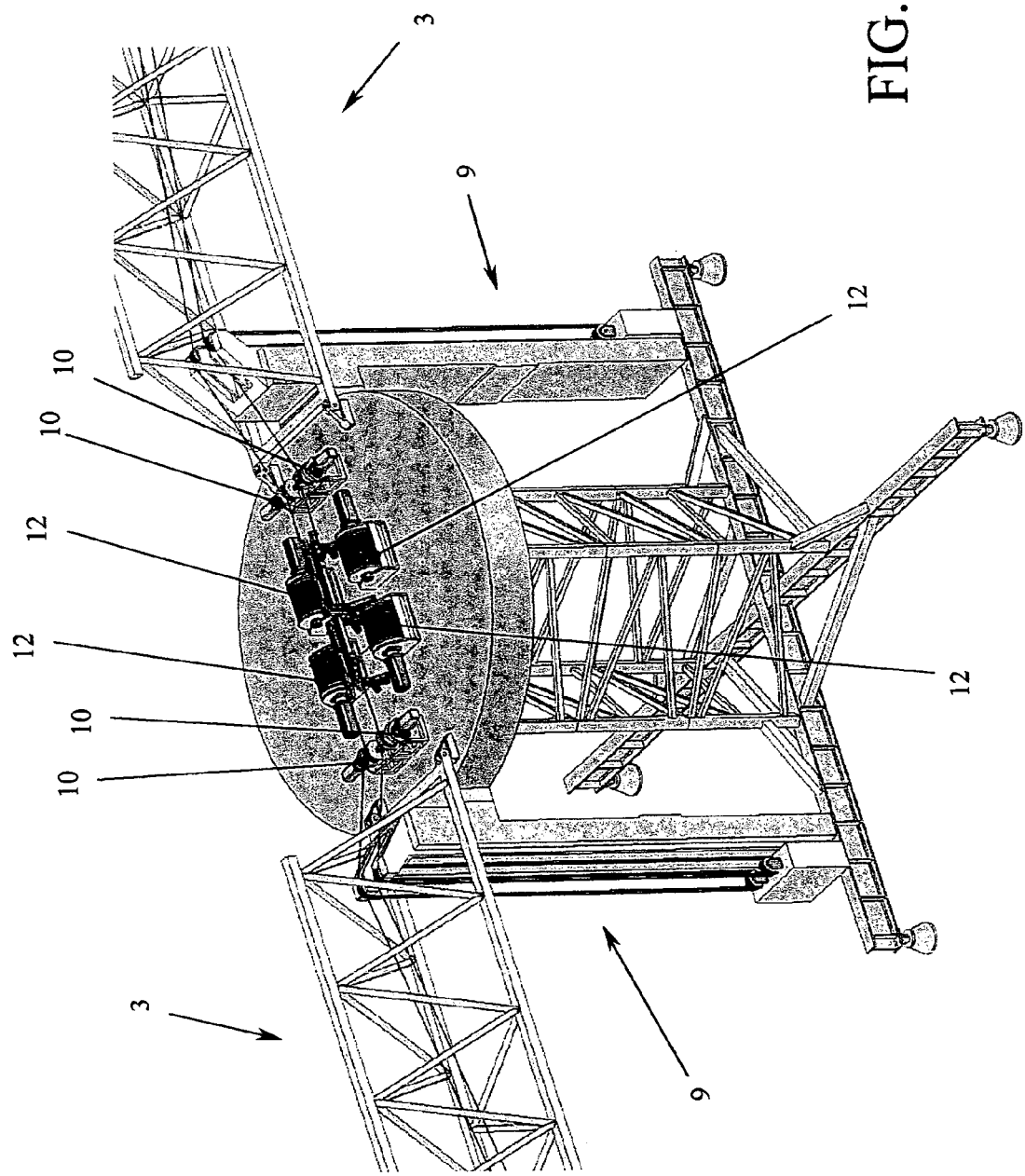
FIG. 10 shows an enlarged perspective view of a component of the wind system of FIG. 3.
Figure 11:
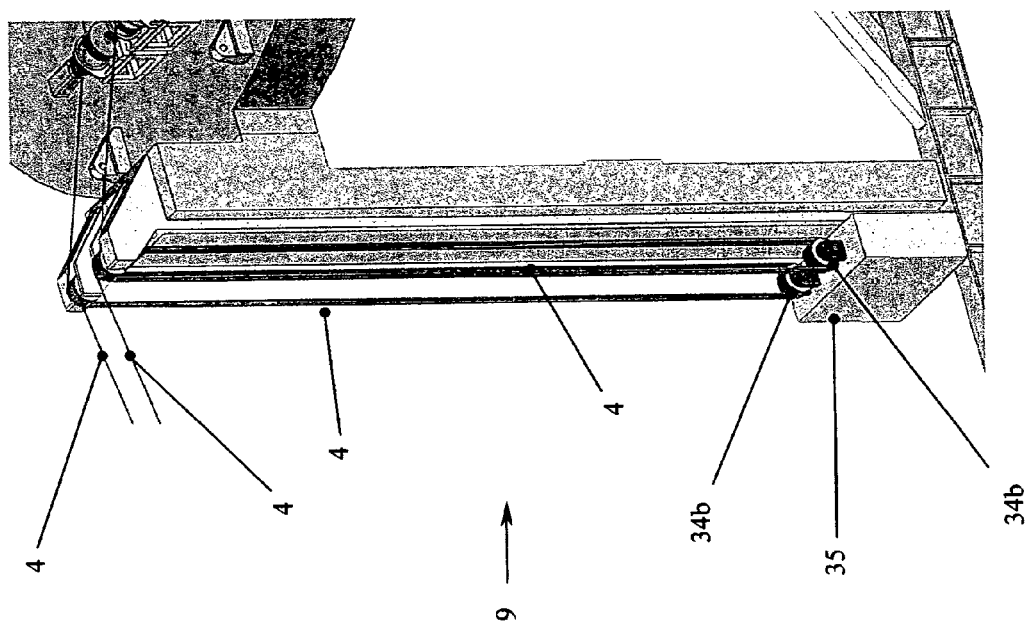
FIG. 11 shows an enlarged perspective view of a component of FIG. 10.

As can be noted from FIG. 10, the potential gravitational energy accumulating system 9 is the component of the turbine 2 arranged upstream of the arms 3 and downstream of the winding and unwinding system 10 of the ropes 4. The turbine can be equipped with an accumulation system 9 next to each arm 3. The function performed by the energy accumulation systems 9 consists in obtaining a reserve of energy, further compensating high load variations, for which it is not enough to compensate through the resiliency of the ropes 4 and of the tensioning systems 8. With reference in particular to FIG. 11, it is possible to note that, in a preferred embodiment thereof, the system 9 is composed of at least two gearing-down pulleys 34a and 34b and at least one counterweight 35 lifted from the ground and able to vertically translate, preferably constrained to suitable guides. The ropes 4 with which the kite 1 is driven are wound around such pulleys 34a and 34b so that it is the tension of such ropes 1 that keeps the counterweight 35 lifted. During the wind system operation, the counterweight 35 can find itself in a position included between two limit heights. In particular, the counterweight 35 is at a minimum height (as shown, for example, in FIGS. 10, 11 and 12) if the pull of the pair of ropes 4 is less than a limit value depending on the weight of the counterweight 35 mass and the number of pulleys composing the energy accumulating system 9. Vice versa, the counterweight 35 is at a maximum height if the ropes 4 pull is greater than such limit value. The energy accumulating system 9 therefore has only two stable statuses: at minimum height and at maximum height. All other intermediate positions are a passage between one state and the other, giving away energy if the counterweight 35 ascends and accumulating energy if the counterweight 35 rises. The pulleys 34a and 34b of the accumulation system are arranged on two levels, an upper one and a lower one. Next to each level, the pulleys 34a and 34b are side by side and have their rotation axes perpendicular to the arm 3 of the turbine 2. The pulleys 34a at the upper level are constrained to the arm 3 of the turbine 2; the pulleys 34b at the lower level are instead constrained to the counterweight 35. Since each kite 1 is driven by means of a pair of ropes 4, from a functional point of view, it is possible to divide the system of pulleys 34a and 34b of every accumulation system 9 into two subsystems. Each of the two ropes 4 is alternatively wound around a pulley at the upper level 34a and a pulley at the lower level 34b. After a certain number of windings that depends on the number of pulleys 34a and 34b with which the accumulation system 9 has to be equipped, each of the two ropes 4 abandons such system proceeding towards the winding and unwinding system of the ropes 10. During the wind turbine 2 operation, each counterweight 35 is kept at its maximum height due to the load of the corresponding pair of ropes 4. During the operating cycle step in which the kites are driven in order not to be opposed to the rotation of the arm to which they are connected, the rope load is much lower than the one supported during the previous steps characterised by a high dragging effect. The rope 4 load decrease makes the counterweight 35 lower in order to compensate for such decrease and keeps the ropes 4 tensioned. When one returns to the steps characterised by a high dragging effect, the smart control system blocks, for a certain time range, the first winches 11 of the unwinding and winding system 10 so that the counterweight 35 is again lifted due to the rope load, thereby accumulating potential gravitational energy. The system must be sized so that the tension drop that occurs during the step of scarce dragging effect of the operating cycle is completely compensated by lowering the counterweight 35, without requiring the intervention of the winding and unwinding system 10 of the ropes 4. Similarly to what has been said for the tensioning systems 8, it is important that the two subsystems of pulleys 34a and 34b of each energy accumulating system 9 are connected to a single counterweight 35. If in fact every subsystem of pulleys 34a and 34b were constrained to a different counterweight, the drivability of the kites 1 by the smart control system would be impaired.

In a preferred embodiment thereof, not shown, the energy accumulating system 9 can instead be made as a hydraulic accumulator. In such case, therefore, the accumulated energy is not any more potential gravitational energy, but gas compression and decompression energy. The wind turbine 2 is equipped with an accumulation system 9 upstream of each arm 3. Obviously, such systems are integral with the arms 3.

Figure 12:
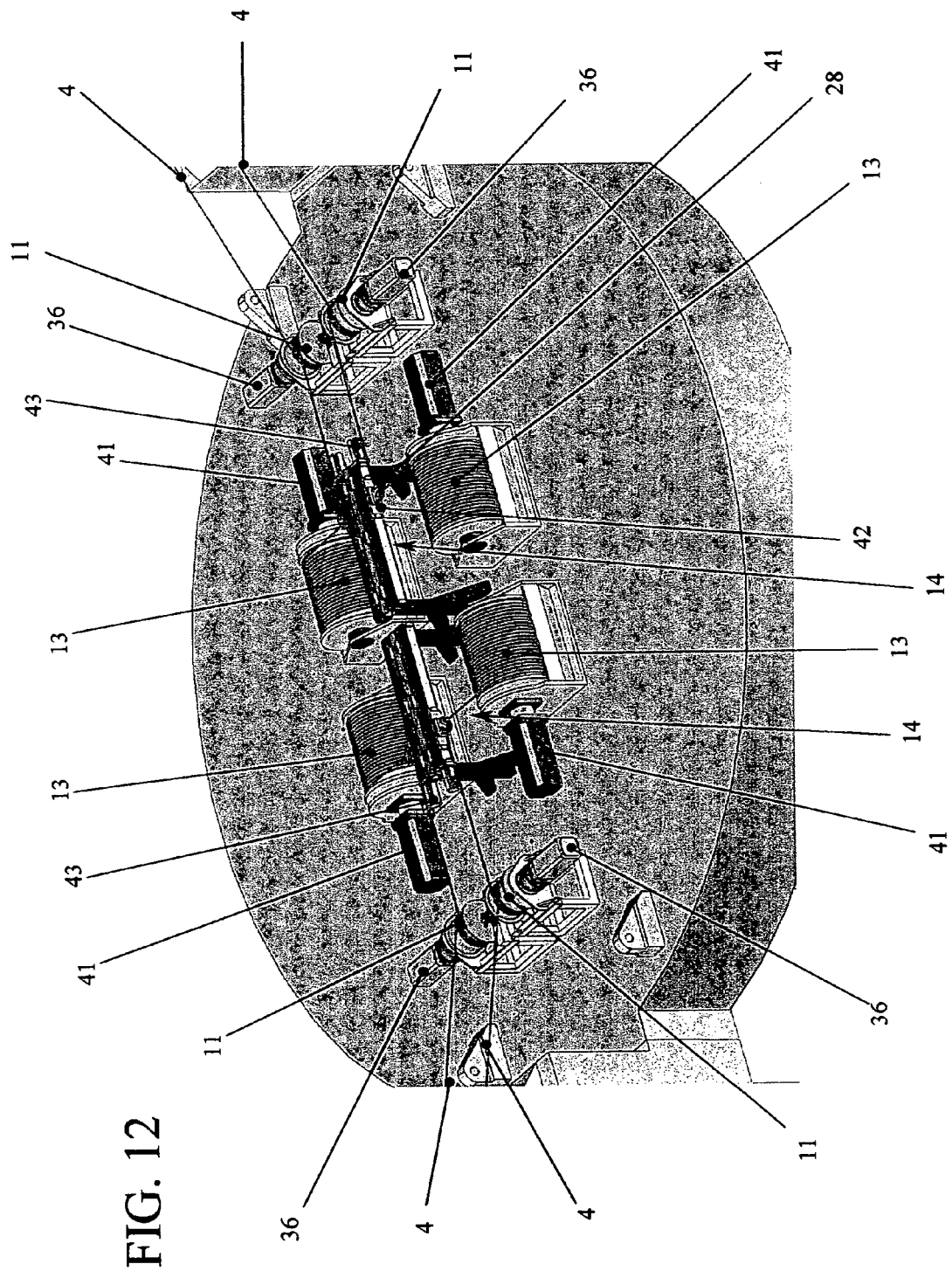
FIG. 12 shows an enlarged perspective view of another component of FIG. 10.

As can be noted in particular from FIG. 12, the winding and unwinding system 10 of the ropes 4 is the component of the turbine 2 placed between the energy accumulating system 9 and the storing system of the ropes 12. Every arm 3 of the wind turbine 2 is equipped with one of these systems 10, each comprising, in a preferred embodiment thereof, a pair of first winches 11 around which the pair of ropes 4 of the corresponding kite 1 are wound. These first winches 11 are connected, through a pair of reducers, to a pair of first motors 36 whose actuation is governed by the smart control system. It is through these first winches 11 that driving of the kite 1 occurs.

Each rope 4, when going out of the gearing-down pulleys 34a of the energy accumulating system 9, is wound around the first corresponding winch 11 of the winding and unwinding system 10, preferably performing only a limited number of revolutions (for example, a couple, or anyway such a number that there is a single layer of windings), after that it proceeds towards the storing system 12. In fact, the winding and unwinding systems 10 are those that support the whole rope pull.

The distinction between winding and unwinding system 10 and storing system 12 of the ropes 4 is made necessary by the great length of the sections of rope 4 connected to the trains of kites 1. If, in fact, there were a single winch for each rope 4, the rope would be completely wound around the winch drum, forming many layers and at the same time supporting big loads. Such situation must be avoided since frictions that would occur due to sliding between different windings, would wear the rope 4 at such a point as to impair its mechanical properties.

Figure 13:
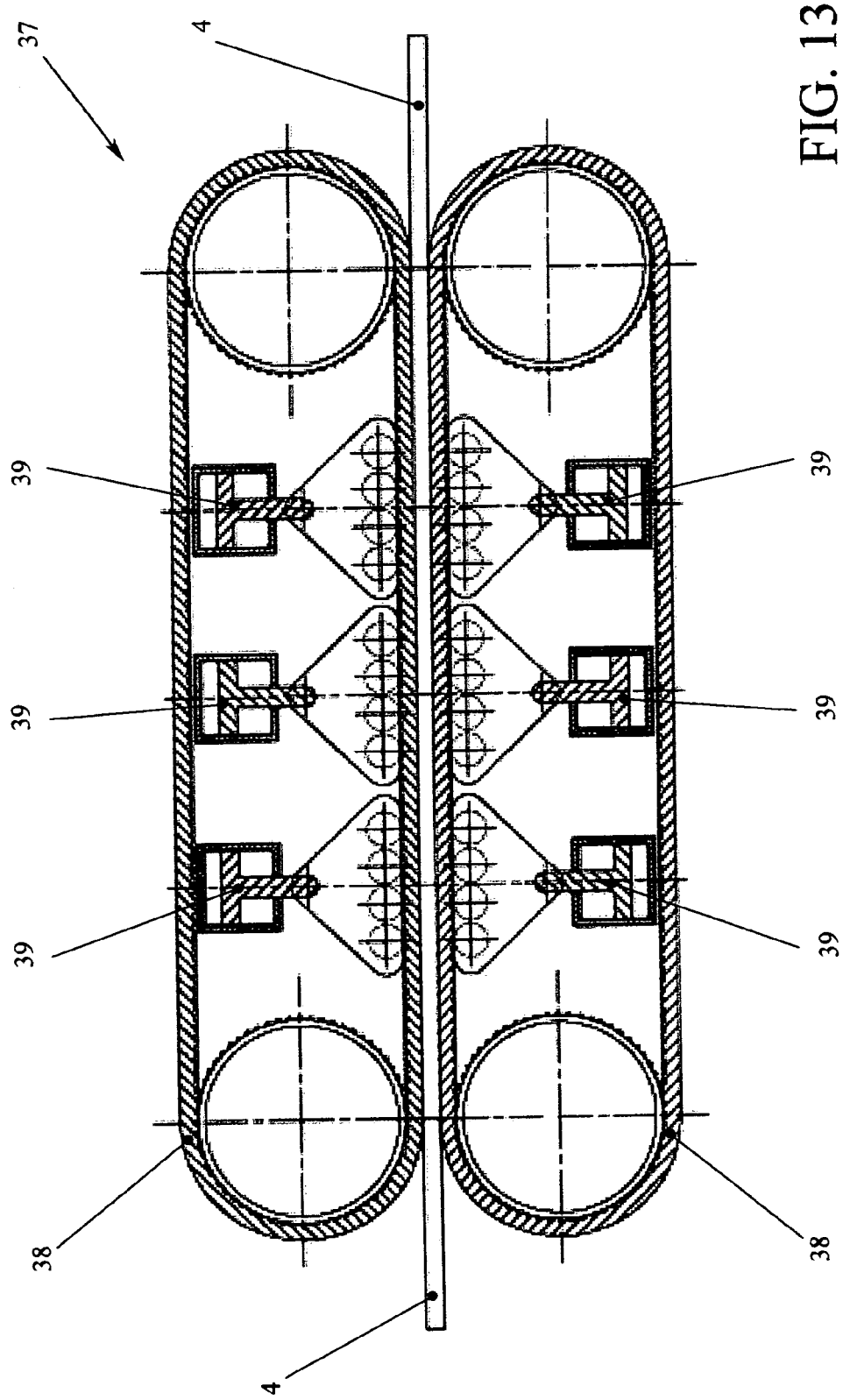
FIG. 13 shows a schematic view of another preferred embodiment of the component of FIG. 12.

Alternatively, the winding and unwinding system 10 of the ropes can comprise, for example, an adequate number of devices 37, like the one shown in FIG. 13, each of which equipped with a pair of faced tracks 38 inside which the rope 4 is inserted. The single faced elements composing the tracks are pushed one against the other by pistons 39, for example, tires, and on each of them a shaped rubber pad is assembled. In devices of this type, the ropes 4 are accompanied towards the kites 1 by the rotation of the tracks 38. Storage of the ropes 4 occurs, for example, upstream of the pair of tracks by means of winches on which however the rope tension is minimum.

Figure 14:
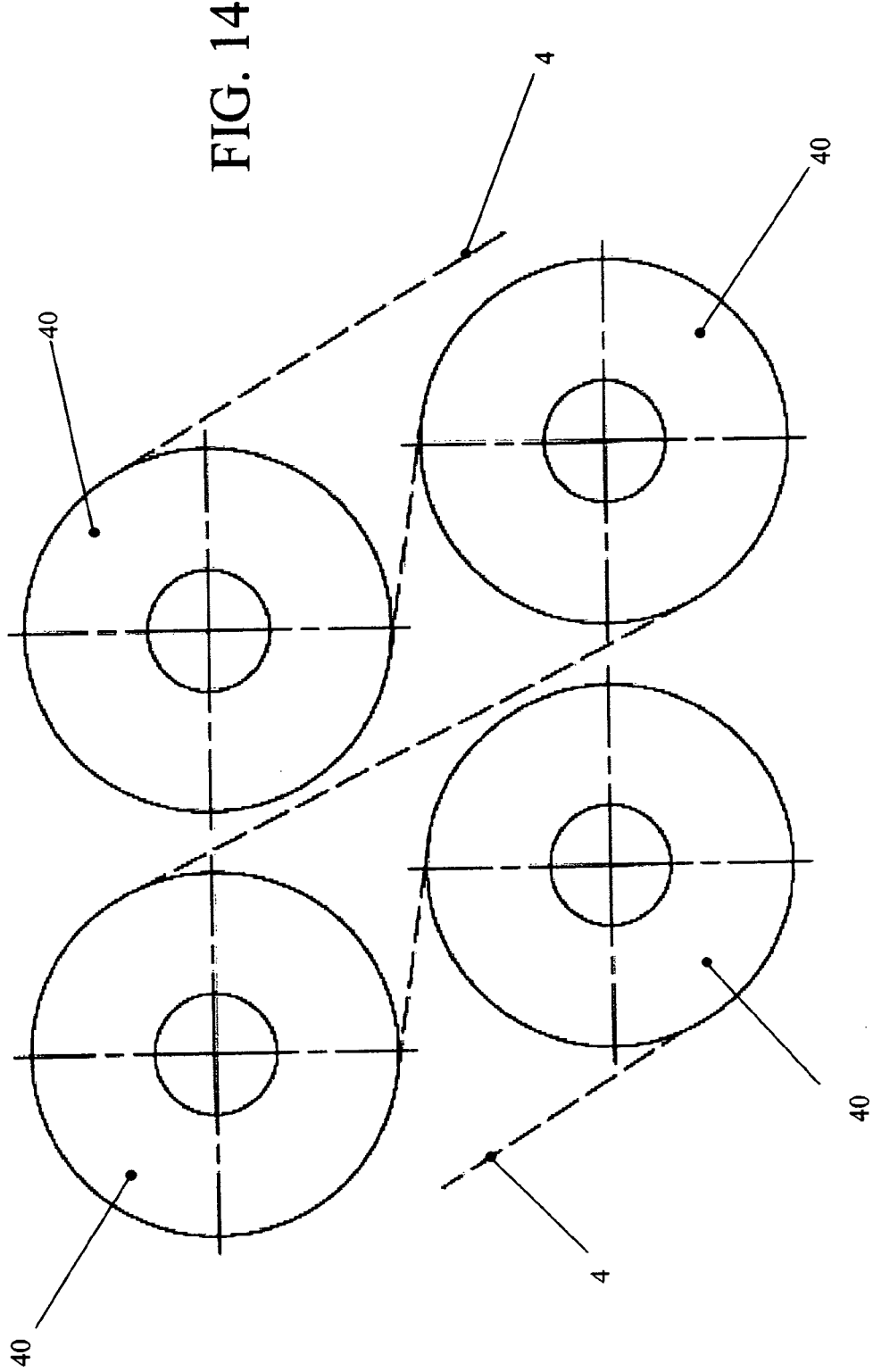
FIG. 14 shows a schematic view of another preferred embodiment of the component of FIG. 12.

In a further alternative embodiment thereof, shown in particular in FIG. 14, the winding and unwinding system 10 can be made of four winches 40 for each rope 4. Such winches 40 are arranged at two levels (two at an upper level and two at a lower level) and have parallel rotation axes. Every rope 4 as an average is wound on each of these winches 40 by about three quarters of a circumference. Since there are four winches 40 for each rope 4, the global windings of a rope 4 on the winches 40 of the present system are equivalent to three complete windings of the rope 4 on a single winch 40. The system with four winches 40 is therefore able to support the ropes 4 load like the first one of the two previously described alternatives. Wear between each winch 40 and the rope 4 can further be increased by suitably shaping the surface of the winches 40, in order to house the rope 4 increasing the contact surface between rope 4 and winch 40.

It is possible to make the surface roughness of the four winches different, in order to progressively increase the wear between rope 4 and winch 40 by proceeding towards the storage systems 12. The advantage deriving from the use of four winches 40 instead of a single one consists in that, in such a way, no risk is run that an overlapping occurs between the different rope windings. In the system 10 equipped with one first winch 11 for each rope 4, when the winch drum rotates, the rope 4 tends to advance towards a face of the first winch 11 (depending on the rotation direction). It is necessary that the rope 4 slides on the drum surface, otherwise, by advancing, it would go out of the first winch 11. Due to the effect of such sliding, there is however the risk that consecutive windings of the rope 4 overlap. Such an occurrence cannot happen in systems equipped with four winches 40 for each rope 4 since, next to each winch 40, the rope 4 does not perform even one complete winding.

The wind turbine 2 can be equipped with a winding and unwinding system 10 of the ropes 4 upstream of each arm 3. Obviously, such systems are integral with the arms 3.

The storing system 12 of the ropes 4 is the component of the wind turbine 2 that takes care to store the ropes 4 of the kites 1.

Similarly to winding and unwinding systems 10 of the ropes 4, every arm 3 of the wind turbine 2 is equipped with one of these systems 12, each of which comprises, in a preferred embodiment thereof shown in FIG. 12, at least one pair of second winches 13 around which the pair of ropes 4 of the corresponding kite 1 is wound. These second winches 13 are connected, through a pair of reducers, to a respective pair of second motors 41 whose actuation is governed by the smart control system.

As previously stated, the storage systems 12 do not also take care of driving the kites 1. In such a way, the tension of the ropes 4 wound around the second winches 13 of the storing system 12 is quite lower than the tension that can be found in the sections of rope 4 wound on the first winches 11 of the winding and unwinding system 10. Therefore, where the ropes 4 load is greatest, the number of windings on drums of the first winches 11 is such that the ropes 4 are never arranged on two or more layers. Vice versa, on the second winches 13 of the storage systems 12, the ropes 4 are wound on many layers but the tension is minimum. The diameter of the drums of the second winches 13 composing the storing system 12 is greater than the diameter of the drums of the first winches 11 of the winding and unwinding system 10, in order to anyway minimise the amount of winding layers.

Obviously, purpose of the smart control system is synchronising the rotation of the first winches 11 of the winding and unwinding system 10 of the ropes 4 and of the second winches 13 of the storing system 12 around which the same rope 4 is wound. This is fundamental for managing the load on the section of rope 4 included between the first and the second winches respectively 11 and 13, above all during the starting and stopping steps of the wind turbine.

Since on the second winches 13 of the storing system 12 of the ropes 4 windings are on many layers, next to each second winch 13 it is necessary to place a guiding module 14 that compels the rope 4 to perform an orderly winding on the second winch 13 and prevents a sliding between rope 4 and faces of the second winch 13 and between windings themselves. The wind turbine 2 is equipped with a storing system 12 upstream of each arm 3. Obviously, such systems are integral with the arms 3.

The guiding module 14 of the ropes 4 is the component of the wind turbine 2 that compels the ropes 4 to perform an orderly winding on the second winches 13 of the respective storing system 12 and that prevents the sliding between ropes 4 and faces of the second winches 13 and between the ropes 4 themselves.

In a preferred embodiment thereof shown in FIG. 10, the guiding module 14 is equipped with a slider 42 constrained to a rail arranged in parallel with the rotation axis of the second winch 13. The slider 42 is able to translate along the two directions and a fourth pulley 28 is assembled thereon. In particular, such slider 42 moves upon every rotation step of the second winch 13. According to the sliding mechanism that determines the movement of the slider 42, it is possible for example to distinguish two types of linear modules adapted for such purpose: screw-controlled and belt-controlled. In screw-controlled modules, the translation of the slider 42 is driven by the rotation of a ball-recirculation precision screw. In linear belt-controlled modules, the slider 42 is assembled on a toothed belt.

In the guiding modules 14 of the ropes, the translation: of the slider occurs together with the rotation of the second winch 13 by means of a third electric motor 43 whose operation is governed by the smart control system that drives the kites 1.

In the wind turbine 2 there are a pair of guiding modules of the ropes 14 next to each arm 3, one for every second winch 13 of the storage systems 12.

Figure 15:
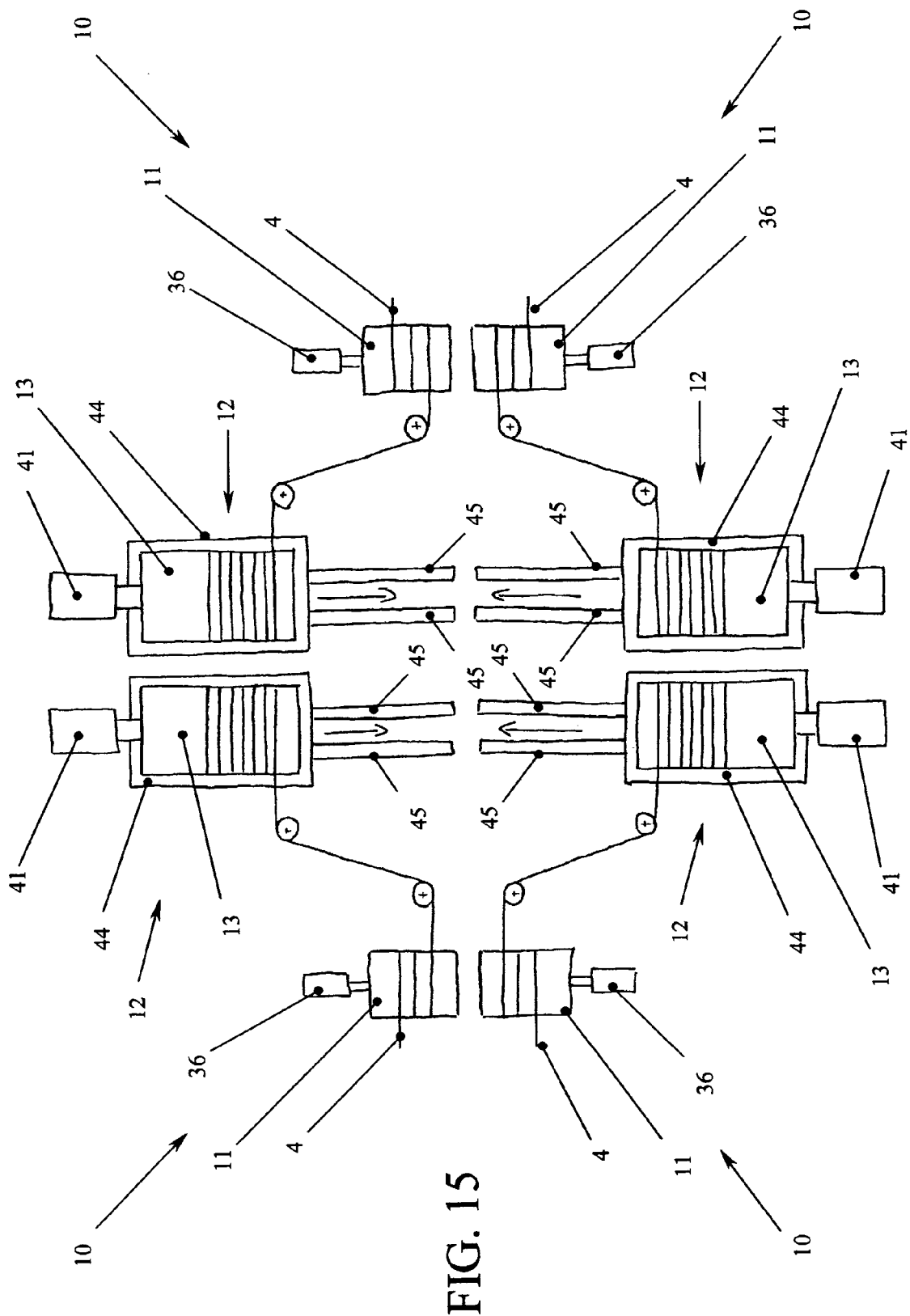
FIG. 15 shows a schematic view of another preferred embodiment of the component of FIG. 12.

As an alternative to the use of guiding modules of the ropes 14, it is possible, for example, to place each second winch 13 of the storage systems 12 of the ropes 4 on a trolley 44 that translates on a guide 45 placed in parallel with the rotation axis of the corresponding second winch 13, such as shown for example in the alternative embodiment of FIG. 15. The sliding of the trolley 44 is driven by a sliding mechanism together with the rotation of the second winch 13 actuated, possibly by interposing at least one epicycloidal reducer, through an electric motor whose operation is governed by the smart control system. By adopting this arrangement, the guiding module of the rope 14 is not necessary any more since it is the second winch 13 that translates in order to guarantee an orderly winding of the rope 4.

The wind turbine 2 is further equipped with electric motors that also operate as generators and generators that also operate as motors.

The electric motors are the components of the turbine through which the actuation of the first and second winches 11 and 13 and of the guiding modules of the ropes 14 occurs. In particular, for each rope 4 the turbine 2 is equipped with three electric motors:

- the first motor 36 responsible for the rotation of the first winch 11 of the winding and unwinding system 10 of the rope 4;
- the second motor 41 responsible for the rotation of the second winch 13 of the storing system 12 of the rope 4;
- the third motor 43 responsible for the translation of the slider 42 of the guiding module 14 of the rope 4 or of the trolley 44 on which the second winch 13 of the storing system 12 of the ropes 4 is assembled.

Each of these motors 36, 41 and 43 could be interfaced with the corresponding winch or the guiding module of the ropes through a reducer, for example of the epicycloidal type.

Since these motors 36, 41 and 43 can operate also as generators, it is possible to produce electricity through the first motors 36 by exploiting the traction exerted by the kites 1 on the first winches 11 of the winding and unwinding system of the ropes 4. Such traction force, in fact, instead of being counteracted, could be used for actuating the first motors 36 operating as generators through the rotation of the first winches 11. The process through which energy is produced according to this mode is, for example, like the one disclosed in EP-A-1 672 214 in the name of Sequoia Automation S.R.L., supra.

The electric motors are driven by the smart control system and those corresponding to the same rope 4 of the kites 1 must obviously operate synchronously.

The generators/motors 15a or 15b are the components of the turbine 2 through which the electricity production occurs. Their actuation is due to the rotation of the arms 3 during the turbine 2 operation. Regarding the electric energy generation, it is possible to adopt two arrangements that are different due to the placement of the generators inside the turbine.

The simpler arrangement consists in placing the generators 15a at the turbine 2 centre. In particular, it is possible to locate three alternatives:

- realising a single generating system operating as rotor the central shaft 16 to which the arms 3 of the turbine 2 are secured and as stator the part secured to the turbine 2 centre. It is advisable to place permanent magnets on the rotor (since they do not need any supply) and to provide the stator with generating circuit windings;
- using a single generator whose rotor is actuated by the rotation of the central shaft 16 by interfacing with a suitable multiplier in order to increase the inlet rotation speed;
- actuating many generators through a system of gears characterised by is wheel that meshes with many pinions, one for each generator, with the function of multiplying and dragging many generating systems.

The alternative arrangement to placing the generator 15a at the wind turbine 2 centre can be applied only if the arms 3 of the turbine 2 rest on the ground by means of dampened trolleys 20 that operate as elastic support. In such case, the generators 15b can be placed directly next to the trolleys 20 and be actuated by the rotation of the wheels 21. For example, it can be thought of providing each trolley 20 with four generators 15b, two for each wheel 21, arranged one on each part. Should this arrangement be adopted, it is necessary to provide the structure with a manifold for transferring the electric energy from the rotary part of the wind turbine 2 to the fixed part.

This arrangement provides the following advantages with respect to the previous ones:

- by suitably dimensioning the diameter of the wheels 21 of the trolleys 20 and the distance of the wheels 21 from the wind turbine 2 centre, the angular rotation speed of the wheels is greater that the turbine 2 speed. This is obviously an advantage regarding the dimensioning of the generators 15b for producing electricity;
- if the generators 15b are assembled on the dampened trolleys 20, the stiffness required for the arms 3 of the turbine 2 is lower, since the motive torque is discharged next to the point where it is generated and therefore the bending torque on the arms 3 is lower. The lower stiffness is translated into less weight of the arms 3 and therefore less energy dissipation due to inertia (upon start-up) and above all in lower manufacturing costs for the structure.

In the wind turbine 2 to which the present invention refers, the generators/motors 15a or 15b also operate as motors, since they determine the rotation of the arms 3 when starting, in order to make the kites 1 ascension easier.

Also the generators/motors 15a or 15b are driven by the smart control system and the wind turbine 2 can be equipped with a variable number of generators/motors 15a or 15b, also according to the fact that they are assembled on the supporting system of the arms 5b or placed at the turbine 2 centre.

The smart control system is the system through which the kites 1 are automatically driven. The main task of this component consists, among other things, in automatically controlling and driving the flight of each kite 1 by driving the operation of the motors from which the rotation of the first and second winches respectively 11 and 13 of the winding and unwinding systems 10 of the ropes 4 and of the storage systems 12, depends. Obviously, each kite 1 is driven independently from the other ones, but anyway avoiding that interferences during the flight can occur.

The automatic control of the flight of a single kite 1 performed by the smart control system is carried out by means of predictive control algorithms implemented by processing means of the smart control system itself through which the kite 1 is driven in order to avoid oscillations, driving instability and local traction maxima. The path run by the kites 1 is predicted in order to optimise the energy produced during an operating cycle with maximum safety, under maximum compliance with dynamic specifications and minimising the necessary time to go from the current position to the predicted one.

The automatic driving of a single kite 1 occurs by means of a real-time process that receives and processes information coming from the set of ground sensors and on board the kite 1. On board the kite 1, a pre-processing of data detected by the set of sensors could be necessary, in order not to overload the wireless communication. Input information are related to the space position of the kite 1, to accelerations, to forces (for example, the rope load determined by reading the motor torques) and to geometrically defined quantities. The process processes such inputs through the predictive algorithms and produces an output that actuates the motors 36 and 41 connected to the first winches 11 and 13.

Processing of input information requires a time interval that is proportional to the data analysis length. By minimising the length of such interval, the delay with which the kite 1 is driven, is reduced. Due to this reason, one tends to give priority to the short-term analysis. A short-term analysis however could not allow predicting a path with optimum time depth. It is therefore important to give priority to an optimum compromise solution, so that data processing occurs in a short time, but enough to allow predicting an optimum path length. It is anyway reasonable to assume that predicting a longer path than the one described during an operating cycle is useless.

The predictive algorithm determines at every instant the optimum position that the kite 1 must occupy in the following instants through suitable flight and control parameters (flight height, counterweight dynamics, traction data, safety computation on off-limits areas (situation with structure stress, instability or excessive forces), instant in which driving must be performed, . . . ). For every time instant, the coordinates of the optimum position (referred to the parameter) that the kite 1 should occupy in such certain instant, correspond to each parameter. Every parameter is also assigned a relative weight whose setting occurs at every instant by means of a feedback system that corrects the weights of the most critical parameters in order to make the decisions about such parameters more important. Once having collected the best coordinates for each parameter, a vector sum for each time instant considered in the prediction is performed. Finally, after having introduced time weights that give priority to short-term strategies, optimum coordinates are computed for each time instant.

After having predicted the coordinates of the ideal positions that the kite 1 must occupy in the following time instants, the real-time process determines the best path that the kite 1 must run to reach these positions. The algorithm used for such purpose employs equations about flight, kite inertia and reaction percentage that it can have depending on the traction differential on cables 4, to determine the kite driving law. Through suitable control techniques, driving is calibrated in order to manage oscillation and excessive gain risks due to inertial reasons, kinematic chain elasticity and measuring delays.

The rotation control of the first and the second winches respectively 11 and 13 is not the only function performed by the smart control system. Such system in fact comprises also a self-calibration subsystem that implements a self-calibration procedure of the set of sensors on board the kites 1.

The sensors assembled on the kites 1 in fact have, a factory pre-calibration and the need of self-calibration stems from the susceptivity of such sensors to the effect of some external variables that are summed for modifying the compliance of measured quantities with the reality. Among external variables there are:

assembling accuracy of the sensors on the kite 1 (that is a flexible support);
time decay of the calibration;
temperature variations (that can displace the sensor offset).

Attitude variations cannot be ascribed to external variables whose effect must be compensated, since they fall within the output, accurately measured, variables.

Variations of magnetic and electromagnetic fields and temporary interruptions of the earth reference are deemed as disturbances.

The methods for performing the sensor self-calibration are substantially based on the redundancy level that direct sensors are able to provide to the system. Moreover, the smart control system has all information available that come from the wind system as a whole, such as for example angles formed by cables and arrangement of the forces measured on the structures.

In addition to instantaneous redundancy, provided by direct sensors in co-operation with available measures, it is possible to use a periodic redundancy, based on the calibration check through the same wind system operation. When the system is operating, the sensors move integral with the kite 1 in space. With respect to the Cartesian reference system of each sensor, the gravity acceleration vector and the earth magnetic field vector change direction and sense but keep their modulus constant. Since the vector modulus is given by the vector sum of the three components measured by each sensor, it is possible to create systems of equations from which a relative error can be extracted that depends on position. With suitable mathematical methods, the error can enter a feedback loop and operate on gain and offset parameters for every single axis.

It is further possible to provide for interactions between substantially known accelerometric and magnetometric sensors due to the fact that, due to its nature and depending on the chosen site for installing the wind system, the earth magnetic field has a constant slanting with respect to the gravity acceleration direction. The angle included between the two vectors can then be deemed as a control variable regarding the self-calibration of the system as a whole.

As regards the use of the magnetometers, it is necessary to remember that the factory calibration of such instruments is certainly not adequate for the destination site operation, since the earth magnetic field has an incidence angle variation depending on the geographic location and the territory morphology joined to its geology. The magnetometer re-calibration therefore becomes mandatory in the first system starting step.

Keeping the self-calibration procedure always active, it is possible to use it also as diagnostic system. In such case; it is however mandatory to provide for traps that, in case of temporary disturbances, prevent a past calibration to be made invalid.

The self-calibration procedure must be able to converge as quickly as possible towards a good calibration, however avoiding to impair the previously reached results. For such purpose, statistic, accumulation and error variance evaluation methods can be used, through which a calibration database can also be created, to which reference must be made to reduce the error probability of the self-calibration subsystem.

The described system must be able to operate without interfering with the normal wind system operation. Such principle cannot however be observed upon the first system start-up, since no databases are yet available that are enough for guaranteeing an adequate calibration safety. This initial limit can be passed by imposing for the kites 1 limited geometric paths, avoiding to exploit all system degrees of freedom. Such pats are intrinsically safer, since they are chosen by relying on absolute sensors, such as the accelerometers, whose factory pre-calibration is deemed reliable as regards system start-up. The degrees of freedom in the movement inside the airspace are limited till the self-calibration algorithm converges. This step needs a relatively short period of time, on the order of seconds. Every complete operating cycle of the wind system contributes to refining the calibration. After a certain number of cycles, the system can be deemed at steady state from the point of view of optimising the self-calibration but, during the wind system operation, the self-calibration is anyway kept active as background function.

The smart control system further comprises a safety subsystem that further intervenes when driving the kites 1 preventing collisions from occurring between such kites 1 and possible aeroplanes or flying objects that occupy the aerial flight space of the wind system of the invention.

The wind system in fact occupies an airspace that can be crossed by other means that are able to fly in the sky, such as aeroplanes and birds. First of all, similarly to what occurs for other types of industrial plants, such as for example nuclear plants, it is therefore advisable to reserve an airspace for the wind system, namely an area with suitable sizes where flights are forbidden.

Such precaution however is not enough to prevent collisions between kites 1 and flying objects since it is necessary, to also take into account unforeseen or emergency situations. In particular, among the flying objects that can "invade" the area with forbidden flight, there are:

aeroplanes that lose their route, but equipped with identification instruments that can be remotely queried;

aeroplanes that, due to their nature, have not the chance of communicating or be identified, nor to know where the flight obstacle can be found, composed of the system kites 1;

flocks or single birds.

The kites 1 fly constrained to the wind turbine 2 with three degrees of freedom: the two director cosines of the bisectrix of the ropes 4 with respect to the rotation plane of the wind turbine 2 and the length of the ropes 4 themselves. These three degrees of freedom allow a sufficient driving autonomy to assume a procedure to avoid collisions with possible aeroplanes that should cross the airspace of the wind system.

This subsystem operation is based on the artificial view of the airspace of the wind system and an adjacent airspace that is widespread enough to guarantee a timely reaction to aeroplanes approaching at high speed. The wind system according to the present invention can therefore comprise an artificial viewing system, for example of the optical or microwave type, cooperating with the safety subsystem. Typically, the classical radar is a scanning beam, while the microwave view produces images, similarly to arrangements that provide for the use of optic cameras.

From the artificial viewing system, all useful information to locate the intersection route between aeroplane and airspace reserved to the wind system, can be extracted or inferred, through a suitable mathematical process. Obviously such route can be univocally determined and is further variable in time (the aeroplane can be under full steering, even in turn in an attempt to avoid the collision). For this reason, it is not possible to assign each approaching aeroplane a well defined route, but a continuously updated hyperbolic cone of probability of the trajectory. In order to build such cone, in case of big, quick and identifiable aeroplanes, it is necessary to know their dynamic characteristics and make available for the control system a database with which interactions can be made after having queried the approaching aeroplane. The hyperbolic cone is built in space and time in such a way as to bring the kites 1 to an interdiction appointment of the space that can be occupied by them, with the purpose of making the kites 1 avoid the area identified by the same cone by circumnavigating it.

The hyperbolic cone has very variable characteristics, shapes and sizes depending on the type of aeroplane, the approaching speed and the driving capability. The more the aeroplane is able to suddenly be driven, the wider is the outlet edge of the cone; the quicker and more scarcely drivable the aeroplanes, the narrower, more foreseeable and circumscribed the edge.

The safety subsystem that takes care of realising the hyperbolic cone communicates to each control unit of the kites 1 the coordinates that point out the interdiction area, with maximum priority with respect to all optimisation parameters of the flight path of the kite 1. Depending on current positions, each control unit has different pieces of information, depending on the current position and of the time computed upon the passage of each kite 1 in the intersection area between wind system airspace and hyperbolic cone. The sottosystem computes the aeroplane approaching speed, and notes the position that the wind system will assume in time. The interdiction area is thereby being formed by intersection and its geometry is continuously being updated, as well as information provided to each control unit. The interdiction area can be observed with a variable safety margin. If a kite must use the interdiction area to be optimally placed with respect to such area and with respect to the foreseen impact time, the system allows its transit. At control level, to allow the algorithm to organise the safety place, it is necessary to rebuild the scene very anticipatedly with respect to the real occurrence of the events, in such a way as to be able to foresee an enough advanced behaviour in the future and sufficiently early program the safety manuoeuvres.

The artificial view system whose task is managing the collision prevention activity has the same plummet called to perform redundancy functions of the measure of the position of the kites 1 in the airspace in order to produce energy. The optical system output becomes therefore from raster to geometric, providing, with suitable mathematical methods, completely known vectors (direction, sense, spin). The radars scan with enough quick rates to produce accurate forecasts. With the artificial view, there is the advantage of being able to recognise some parameters in a single scan. The other useful pieces of information for the processing algorithm of the hyperbolic probability cone of the trajectory and of the aeroplane route are the positions of the kites 1 and the identifier of the aeroplane type, that can occur digitally for preset aeroplanes or heuristic for birds and aeroplanes that cannot be catalogued.

In case of emergency, the primary purpose of the wind system, namely the electric energy production, gets second or third priority. Firstly, the safety subsystem will try and avoid the collision; secondly, it will have to avoid taking the wind system under critical conditions for itself, thereby safeguarding both the aeroplane and the wind turbine, and allowing to restart the energy conversion process after the emergency.

In case of flocks of birds or aeroplanes whose flight behaviour cannot be forecast, the safety subsystem increases the driving margins of the kites 1, reaching acrobatic performances or taking the kites 1 under limited navigation speed conditions. Such manoeuvres are made possible by the very low inertia of the kites 1, that are substantially ultralight ones equipped with enormous command forces. An ultralight vehicle equipped with enormous command forces in fact can make accelerations that tend to infinite. The kites 1, due to their great drivability, can be kept at the speed of mere support in air, thereby representing a more foreseeable, less sudden obstacle, that does not generate undesired reactions by pilots or birds.

A flock or a single bird, in fact, can in turn react when seeing the kites 1, as well as an aeroplane pilot. It is then advisable to evaluate to take the hyperbolic probability cone of the trajectory and of the route of the aeroplane out of view. The wind system must not add discomfort or further risks.

The last and extreme emergency level brings to a high-speed withdrawal of the kites 1 in the arms of the wind turbine 2. Quick recovery systems can be arrived at through a kite unwinding procedure through a wide difference of the length of the ropes, followed by a quick rewinding. The unwound kite 1 will follow the axial line without lift, namely the bisectrix of the driving ropes 4.

As last situation, the wind system according to the present invention can comprise a shearing system (not shown) of the ropes 4 that, by cooperating with the safety subsystem, takes care of interrupting the kite traction line. Such arrangement can bring about the abandonment and loss of the kites 1, that, without an axial force, become inert bodies. This situation is managed by a so-called "watch dog", whose intervention follows the loss of control by the smart control system.

As previously said, the smart control system takes also care of actuating the guiding modules 14 of the ropes 4. The third motors 43 that actuate such modules 14 are driven in order to suitably couple the rotation of the drums of the second winches 13 to the translation of the sliders 42 of the guiding modules 14. Similarly, if the wind system is not equipped with the guiding modules 14 of the ropes 4 but with trolleys 44 on which the second winches 13 of the storing system 12 of the ropes 4 are assembled, the motors by means of which these trolleys translate, are actuated by the smart control system.

It is therefore by means of the smart control system that speed and translation direction of the sliders 42 or of the second winches 13 are adjusted in order to compel the ropes 4 to be orderly wound on the second winches 13 and prevent a sliding between ropes 13 and faces of the second winches 13 and between the ropes 4 themselves.

The smart control system also governs the operation of the generators/motors 15a or 15b. In particular, the system intervenes upon starting the wind turbine 2, actuating the motors to allow rotating the arms 3 and facilitating the kites 1 ascension.

The smart control system must finally recognise and most timely deal with unforeseen events such as wind strokes and load losses. In case of wind strokes, if the load increase is not completely compensated by the tensioning and dampening systems 8 of the same ropes 4, the control system intervenes by reducing the ropes 4 tension to avoid that the excessive load damages the wind system. This occurs by actuating the first winches 11 in order to allow a quick unwinding of the ropes 4. The sudden load decreases must be avoided since a scarce tension on the ropes 4 makes the kite 1 precipitate without driving possibilities. During a standard operating cycle, a load decrease occurs next to the step whose dragging effect is scarce. Such tension drop is however foreseen, and therefore the energy accumulation systems 9 are sized in order to guarantee a suitable tension of the ropes 4 during this step without requiring the intervention of the winding and unwinding systems 10 of the ropes 4. If a sudden load decrease occurs, not connected to the step of scarce dragging effect, if the tensioning systems 8 do not manage to compensate for the load drop, the smart control system intervenes by quickly rewinding the ropes 4. In such a way, the control of the train of kites 1 is recovered.

The supply system comprises all necessary components for accumulating and delivering electric energy. In particular, the wind turbine 2 is equipped with power supplies, transformers and accumulators through which the produced electricity can be stored, current can be delivered to motors during the starting step of the turbine 2 and for recovering the kites 1, supplying all electronic components and providing electric power to external users. The operation of all electronic components of the wind system is controlled by the smart control system.

From what is stated above, it is clear that the wind system according to the present invention is a vertical-axis wind turbine actuated by means of kites automatically driven by a smart control system. With respect to what has been proposed by the current art, such wind system provides for an innovative control mode of the kites since there is no distinction between driving ropes and power ropes, both such functionalities being performed by a single pair of ropes 4 for each kite 1. While in existing designs there are winches with which the kites can be driven and winches for recovering the kite and producing electricity, in the wind system according to the present invention the first winches 11 are used exclusively for driving the kite 1 and the same driving ropes 4 wound around such first winches 11 allow converting energy determining the rotation of the arms 3 of the turbine 2. The starting angle of the wind and the windfront area of the wind current intercepted by the kites 1 are then controlled by adjusting the length of the unwound sections of rope 4, in order to obtain the maximum power delivery.

The present invention further refers to a process for producing electric energy through a wind system like the previously described one.

In general, the process according to the present invention, that integrates the energy conversion process from wind energy to electric energy enacted through the wind system according to the present invention, comprises four steps that are cyclicaly repeated during the wind system operation. With reference as an example to a single arm 3 of the turbine 2, during the first three steps of the process according to the present invention, the rotation of the arm 3 is due to the wind energy subtracted to the wind by means of the kites 1 connected to such arm 3. The smart control system therefore guides the kite 1 connected to the arm 3 so that the wind energy that it is possible to subtract to the wind is maximum compatibily with the need of keeping the two ropes 4 as much as possible perpendicular to the arm 3 during the whole step. In fact, the more tangential the ropes 4 are to the arc of circumference followed by the external end of the arm 3, the greater is the useful component of the traction force in order to generate the moment that makes the arm 3 rotate. The fact that the ropes 4 are kept perpendicular to the arm 3 of the turbine 2 implies that the control system drives the kite 1 in order to mainly exploit the lift force, namely the component of the force that is perpendicular to the wind speed. In such a way, the kite 1 advances going on brushing the surface of the windfront. The wind then advances the kite 1 tensioning the ropes 4 connected to the arm 3 of the turbine 2: this dragging effect makes the arm 3 rotate and produces electric energy by means of the generators/motors 15a or 15b depending on generators actuated by such rotation, through the possible interfacing of reducers. It must be remembered that the arms 3 of the turbine 2 are to be deemed as making part of a single rigid body since they are constrained to a single rotary central shaft 16. This means that the wind power available for conversion into electric power in a given instant of the operating cycle, is given by the sum of the contributions of all arms 3.

The fourth step of the process according to the present invention instead occurs in the downwind area. The smart control system drives the kite 1 in order to quickly cross such area without producing any braking effect on the arm 3 of the turbine 2. In particular, not only the smart control system guides the kite 1 in order to rotate the arm 3 but, during such step, a dragging effect by the kites 1 is still present (even if scarcely efficient). The rotation of the examined arm 3 during such step therefore occurs above all due to the rotation effect of the arms 3 of the turbine 2 that are in the other three steps, and is therefore due to the wind energy subtracted to the wind by means of the kites 1 connected to other arms 3.

Figure 16:
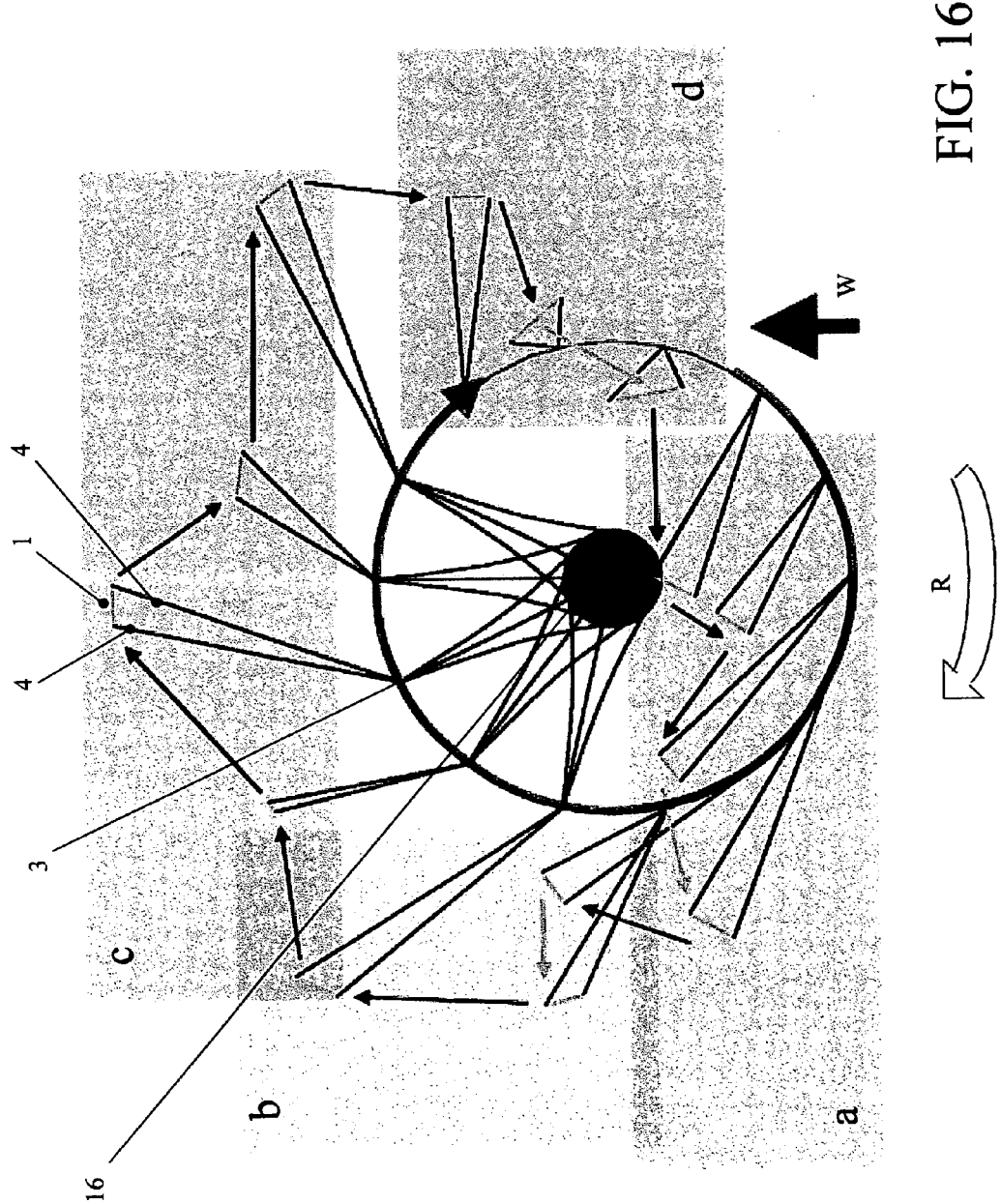
FIG. 16 shows a schematic view of the system according to the present invention in some operating steps thereof.

With particular reference to FIG. 16 that shows a potential path followed during a standard operating cycle of the wind system according to the present invention and supposing that the wind speed direction W and the rotation sense designated by the arrow R of the turbine 2 are kept constant, focusing the attension on a single arm 3 of the turbine, the four steps composing the process according to the present invention, respectively designated through the dashed boxes a, b, c e d delimiting the various space areas in which the kite 1 is, depending on the wind current direction W in which it is immersed, are as follows:

a) during such step the kites 1 proceed transversally with respect to the wind direction W (box a in FIG. 16). The wind therefore blows transversely with respect to the kite advancement direction. The length of the unwound rope sections increases since the kites 1 are going away from the arm 3 of the turbine 2. At the beginning of the step, the dragging effect of the kite 1 is used for lifting the counterweight of the corresponding energy accumulating system 9. This occurs by exploiting the load itself of the ropes 4 and preventing the second winches 13 of the storing system 12 of the ropes 4 from rotating. In this way, potential gravitational energy is accumulated, that will be returned in a following fourth downwind step, when an azimuth turn will occur, to compensate for the sudden decrease of the rope load. In this step it is therefore necessary to govern the flight trajectory of the kite 1, preferably through the smart control system, so that the kite 1 transversally proceeds with respect to the wind direction W, the kite 1 thereby tensioning the ropes 4 connected to the arm 3 of the wind turbine 2, consequently rotating the arm 3 itself due to the dragging effect and going away from the arm 3 of the wind turbine 1, making the counterweight 35 of the respective energy accumulating system 9 rise;

b) during such step, the kite 1 proceeds along the same direction W in which the wind blows (box b in FIG. 16). In such step, exploiting the kite resistance is summed to exploiting the kite 1 lift. This makes the kite 1 speed greater than the wind speed and, in order to exploit the dragging effect, it is necessary to partly rewind the ropes 4. In spite of such recovery, even during this step, the energy balance is positive. In such step, it is therefore necessary to govern the flight trajectory of the kite so that it proceeds along the same direction in which the wind blows, the kite 1 therefore tensioning the ropes 4 connected to the arm 3 of the wind turbine 2 rotating the arm 3 itself due to its dragging effect, and making the kite 1 approach the arm 3 of the wind turbine 2 by rewinding the ropes 4 through the first winches 11 of the first electric motors 36 without a lowering of the counterweight 35 of the respective energy accumulating system 9;

c) similarly to what occurs during the above first step a) of transverse wind, in this step the kite 1 is taken to transversally proceed with respect to the wind direction W (box c in FIG. 16) and the length of the unwound sections of rope 4 grows since the kite 1 goes away from the arm 3 of the turbine 2. Unwinding during such step is controlled by the smart control system in order not to allow lowering the counterweight 35 of the storing system of the ropes 4. This allows storing the potential energy for the following step of the operating cycle. In this step it is therefore necessary to govern the flight trajectory of the kite 1 so that it proceeds transversally with respect to the wind direction W, tensioning the ropes 4 connected to the arm 3 of the wind turbine 2 and rotating the arm 3 itself due to its dragging effect, and moving away the kite 1 from the arm 3 of the wind turbine 2 by unwinding the ropes 4 through the first winches 11 by means of the first electric motors 36 without a lowering of the counterweight 35 of the respective energy accumulating system 9;

d) during this step, the kite 1 proceeds along an opposite direction with respect to the wind direction (box d in FIG. 16). The smart control system drives the kite 1 in order not to generate any braking effect since a sudden manoeuvre called "azimuth turn" is performed, that consists in a quick transition between the two cross members, during which the kite 1 runs in air for a distance that is equal to at least three times the affected arc of circumference in the time in which the turbine 2 moves along such arc. The kite 1 lowers its height without opposing in any way the rotation of the arms 3 of the turbine 2. During such step, it is necessary to recover, in relatively short times, a long section of unwound rope 4. By suitably sizing the energy accumulating system 9, it can be devised to compensate for the load drop of the ropes 4 and actuate at the same time their recovery by lowering the counterweight of such system in order not to require the intervention of the smart control system that possibly contributes to the recovery by actuating the first and second winches respectively 11 and 13 of the winding and unwinding system 10 of the ropes 4 and of the storing system 12 of the ropes 4.

At the end of the azimuth turn, the kite 1 is placed in order to be captured by the wind and proceed transversally with respect to this latter one. In this step it is therefore necessary to govern the flight trajectory of the kite 1 so that it proceeds along an opposite direction with respect to the wind one without generating any braking effect as regards the rotation of the arm 3 of the wind turbine 2, and make the kite 1 approach the arm 3 of the wind turbine 2 by lowering the counterweight 35 of the respective energy accumulating system 9 so that the kite 1 goes back to a position starting from which one can proceed transversally with respect to the wind direction W;

e) repeat the previous steps cyclically for every complete rotation of the arm 3 of the wind turbine 2.

In the process according to the present invention, therefore, during the transverse wind steps the kite 1 goes away from the arm 3 of the turbine 2; instead, during the underwind and downwind steps, the kites 1 approach the arm 3 of the turbine 2 since it is necessary to recover the ropes 4. It must anyway be stated that, during the whole operating cycle according to the present process, the kites 1 are driven in order to alternatively gain and lose height. This choice is first of all caused by a technical need, since the arms 3 of the turbine 2 rotate more slowly than the kites 1. Secondly, the continuous alternance between gain and loss of height is also extremely advantageous as regards energy optimisation that can be subtracted to the wind. In fact, by brushing the wind front surface, the power that the kites are able to develop is greater, as will be described below in more detail.

The energy generated when unwinding the ropes 4 is greater than the one expended for rewinding them. The energy balance is therefore positive. Using the process according to the present invention, and due to the smart control system that, by processing in real time information coming from the set of sensors assembled on the kites 1 and the set of ground sensors, it is possible to drive the kites 1 so that they ascend by mainly exploiting the lift force. In this way, the path followed by each kite 1 during every cycle of the process is optimum in terms of wind energy that can be subtracted to the wind, following paths in order to intercept the maximum air volume. The process according to the present invention therefore guarantees not only continuity in producing electricity, but also the optimisation of energy that can be obtained in every cycle with the same size of the kite with respect to known systems.

As proof of the high efficiency demonstrated by the wind system and process according to the present invention, it is possible to provide some remarks dealing with the power that a single kite 1 is able to subtract to the wind.

Figure 17:
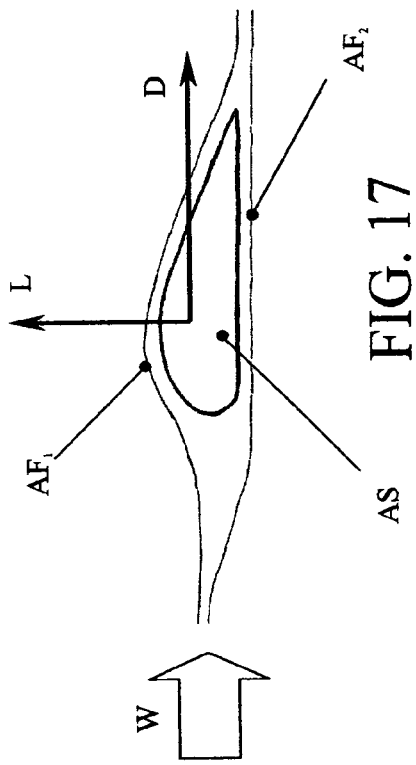
FIG. 17 shows a schematic view of a stationary aerodynamic surface immersed in a wind current and the related forces that are generated.

For such purpose, with particular reference to FIG. 17, it is suitable first of all to describe the system aerodynamics. It is known that, when a wind current meets a stationary aerodynamic surface (airfoil), such current generates two forces: the drag force D parallel to the direction W along which the wind blows and the lift force L perpendicular to such direction W. In case of laminar wind flow, the wind currents $AF_1$ passing above the airfoil AS are quicker than the currents $AF_2$ passing below it, since they must travel along a longer distance. This decreases the pressure in the upper part of the kite and therefore a pressure gradient that gives rise to the lift force L.

Figure 18:
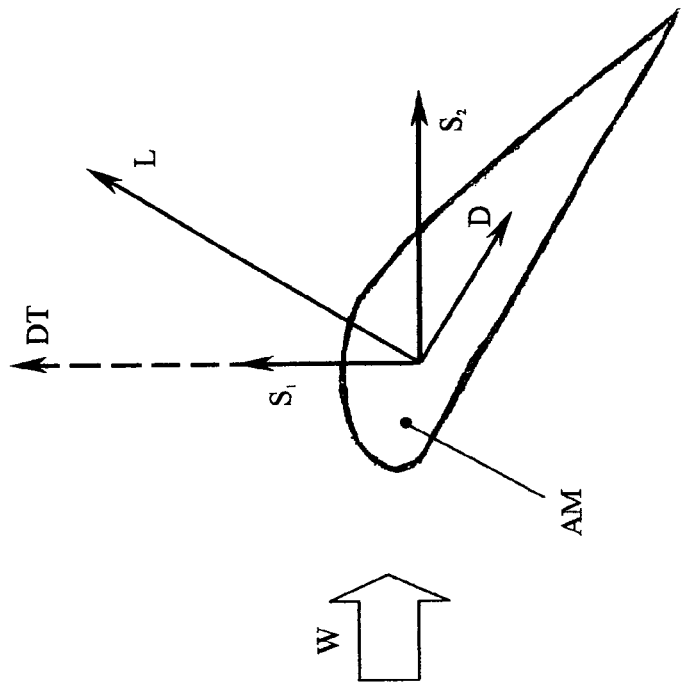
FIG. 18 shows a schematic view of an aerodynamic surface free of moving along the perpendicular direction to the wind speed and the related forces that are generated.

With reference instead to FIG. 18, suppose that the kite AM can move along the direction DT of the lift force. Due to the effect of such motion, the lower surface of the aerodynamic kite AM is inclined with respect to the wind speed. In such case, lift force and drag force are respectively perpendicular and parallel to the relative wind speed with respect to the kite.

By designating with $S_1$ the parallel force to the motion direction and with $S_2$ the perpendicular force to such direction, the component of the lift force L parallel to the motion direction has the same sense as the translation of the aerodynamic kite AM while the parallel component of the drag force D has an opposite sense.

For this reason, in order to keep the motion in a perpendicular direction to wind currents, it is advisable to incline the kite AM in order to obtain a high ratio between lift force L component along the motion direction DT of the kite AM with respect to the drag force D component.

These remarks are also valid for every single wind system kite 1.

The smart control system in fact drives each kite 1 in order to keep the ratio between lift force and drag force high during the steps characterised by a high dragging effect by the kites 1. In this way, the kites 1 oscillate brushing the wind front and generating power due to the ropes 4 pull.

The power generated by a single kite 1 is computed by multiplying the Specific Wind P by the front wind area intercepted by the kite (namely the kite area) A and by the Kite Power Factor KPF, a performance coefficient depending on the ratio $V_k/V_w$ between kite speed $V_k$ and wind speed $V_w$ and two coefficients $K_d$ and $K_l$.

The coefficient $K_d$ refers to the drag, namely when the kite pulls the ground constraint with forces and speed along the wind direction, while the coefficient $K_l$ refers to the lift, namely when the kite pulls the ground constraint by oscillating in order to brush the wind front surface. Due to the lift, the kite speed is quite higher that the wind speed. The kite power is as higher as greater is the lift with respect to the drag.

As an example, suppose $V_k/V_w=10$, $K_l=1.2$ and $K_d=0.1$. In such a way, KPF=20 would be obtained.

Supposing the air density ρ constant and equal to 1.225 kg/m$^3$, the specific power generated by the Specific Wind Power would be:

$$SpecificWindPower = \frac{1}{2}\rho V_w^3 = 0.5 * 1.225 * 6^3 = 132.3 \text{ W/m}^2$$

The power that can be generated by means of the kite, KitePower, is expressed by the following formula:

KitePower=*KPF*\*SpecificWindPower\**A*

If, for example, a kite were used with a surface of 18 m$^2$ pushed at the speed of 60 m/s by a wind blowing at 6 m/s, the power that it would be possible to generate at rope level would be 47628 W. Such power would correspond therefore to the maximum power that the kite is able to generate.

The value assumed by KPF anyway depends on the kite efficiency. It is possible to make KPF assume values greater than 20. If for example KPF assumed a value equal to 40, the maximum power that can be obtained by a kite whose area is 18 m$^2$ would be 95256 W.

The wind system to which the present invention refers allows converting wind energy into electric energy by delivering a power on the order of some Megawatts. However, due to the high scalability of the described system, it is possible to easily perform some modifications to the embodiment to obtain a wind system that is able to generate powers of a quite higher order, such as for example 1 Gigawatt.

The invention claimed is:

1. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the at least one arm of the wind turbine is supported through at least one supporting system, the supporting system comprising tie-rods constrained at one end to the at least one arm of the wind turbine, and at another end to a single vertical structure placed at a center of the vertical-axis wind turbine and rotating with the at least one arm, and/or the supporting system comprising tie-rods placed in a rotation plane of the wind turbine constrained at one end to the at least one arm of the vertical-axis wind turbine, and at another end to a central rotary shaft of the vertical-axis wind turbine, and/or the supporting system further comprising at least one dampened trolley through which the at least one arm of the turbine is elastically rested onto the ground, and/or the supporting system comprising an elastic member coupled in parallel with at least one dampener, the at least one dampened trolley including at least one pair of wheels aligned with rotation axes passing through a rotation center of the vertical-axis wind turbine.

2. A wind system of claim 1, wherein the wind system further comprises a supply system cooperating with the smart control system for managing an energy accumulation or delivery.

3. A wind system of claim 1, wherein the set of sensors placed on the at least one kite sends information in wireless mode to the smart control system.

4. A wind system of claim 1, wherein the generator/motor system is actuated by a rotation of the at least one arm of the vertical-axis wind turbine when the generator/motor system operates as a generator and is controlled by the smart control system when the generator/motor system operates as a motor, the generator/motor system comprising a system of gears including pinions configured to multiply and drag a plurality of generators.

5. A wind system of claim 1, wherein the generator/motor system is disposed on the dampened trolley and is actuated by rotating the at least one pair of wheels, the generator/motor system being connected to the at least one pair of wheels by interposing at least one epicycloidal reducer, a transfer of the electric energy from the generator/motor system to a fixed part of the vertical-axis wind turbine occuring through a manifold.

6. A wind system of claim 1, wherein the smart control system is configured to operate on the at least two winches of the winding and unwinding system of the two ropes and to guide the at least one kite along the flight trajectory through a processor that implements at least one predictive algorithm that determines upon every instant an optimum position that the at least one kite must occupy in at least one following instant depending on flight and control parameters, of information sent from the set of sensors placed on the at least one kite and from the set of ground sensors, giving priority to a lift force generated by the at least one wind current.

7. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the at least one arm of the vertical-axis wind turbine comprises at least one recovering device adapted to recover the at least one kite at rest, the at least one recovering device comprising at least one cylindrical pipe, the at least one cylindrical pipe comprising a rounded outlet edge, the at least one recovering device being inclined with respect to the arm.

8. A wind system of claim 7, wherein the at least one arm of the vertical-axis wind turbine comprises at least one recovering and expelling system of the at least one kite, the at least one recovering and expelling system being placed inside the recovering device, the at least one recovering and expelling system comprising at least one trolley sliding along at least two rails inside the at least one cylindrical pipe of the recovering device, the at least one trolley being actuated by at least one belt driven by a motoreducer, the at least one recovering and expelling system comprising an artificial wind thrust device configured to create an artificial air flow upon expelling the kite from the at least one recovering device.

9. A wind system of claim 8, wherein the at least one arm further comprises a transmission system configured to guide the two ropes towards the kite, the transmission system comprising,
at least one pair of first pulleys assembled on the trolley of the recovering and expelling system of the at least one kite,
second fixed pulleys assembled on the at least one arm of the vertical-axis wind turbine,
at least one pair of third pulleys for each one of a tensioning and dampening system of the two ropes, and
at least one pair of fourth pulleys assembled on sliders of guiding modules of the two ropes,
the sliders being configured to slide along a rail in parallel with a rotation axis of a winch, a sliding of the sliders along the rail being controlled by a sliding mechanism together with a rotation of the winch, the sliding mechanism being actuated by an electric motor controlled by the smart control system, the sliding mechanism being of a screw-driven or belt-driven.

10. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the at least one arm of the vertical-axis wind turbine comprises a tensioning and dampening system of the two ropes, the tensioning and dampening system comprising at least one dampened counterweight lifted from the ground and capable of vertically translating, the counterweight being lifted from the ground due to a tension of the two ropes, the tensioning and dampening system comprising at least one device comprising a rod hinged next to an end to the at least one arm of the vertical-axis wind turbine, the rod being co-operating with the at least one arm by interposing an elastic member, the elastic member comprising at least one dampened spring.

11. A wind system of claim 10, wherein the tensioning and dampening system of the two ropes comprises a hydraulic accumulator.

12. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the at least one arm of the vertical-axis wind turbine comprises a potential gravitational energy accumulating system, the potential gravitational energy accumulating system comprising at least two gearing-down pulleys and at least one counterweight lifted from the ground and capable of vertically translating, the two ropes being wound around the at least two gearing-down pulleys, the at least one counterweight being lifted from the ground due to a tension of the two ropes, the at least two gearing-down pulleys being arranged respectively in a lower level and in an upper level, a gearing-down pulley in the upper level being constrained to the at least one arm of the vertical-axis wind turbine and a gearing-down pulley in the lower level being constrained to the at least one counterweight.

13. A wind system of claim 12, wherein each one of the two ropes is alternatively wound around the gearing-down pulley in the upper level and the gearing-down pulley in the lower level.

14. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the at least one arm of the vertical-axis wind turbine comprises a winding and unwinding system of the two ropes, the winding and unwinding system comprising at least two winches on each of which a respective one of the two ropes is wound and unwound, each one of the at least two winches being connected to an electric motor controlled by the smart control system, the electric motor comprising an electric generator, around each of the at least two winches a respective rope being wound by performing a limited number of revolutions, so that there is a single layer of windings.

15. A wind system of claim 14, wherein the winding and unwinding system of the two ropes comprises at least two pairs of facing tracks pushed by pistons inside each one of which one of the two ropes is inserted.

16. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite; and a smart control system configured to automatically control the at least one kite along the flight trajectory, the smart control system including a set of sensors placed on the at least one kite and a set of ground sensors,
wherein the at least one arm of the vertical-axis wind turbine comprises at least one storing system of the two ropes, the storing system of the two ropes comprising at least two winches on each one of which a respective one of the two ropes is wound or unwound, each of the two winches being connected to an electric motor controlled by the smart control system, the at least two winches being connected to the electric motor by interposing at least one epycicloidal reducer, each of the at least two winches comprising a guiding module configured to compel the two ropes to be orderly wound on the at least two winches, respectively, the at least two winches being assembled on a trolley sliding along a rail in parallel with a rotation axis of the at least two winches, a sliding of the trolley along the rail being controlled by a sliding mechanism together with a rotation of the at least two winches, the sliding mechanism being actuated by another electric motor controlled by the smart control system, the sliding mechanism being connected to the another electric motor by interposing at least one epicycloidal reducer.

17. A wind system for converting energy comprising:
at least one kite that can be driven from ground, disposed to be immersed in at least one wind current;
a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine the two ropes being configured both to transmit mechanical energy from and to the at least one kit and to control a flight trajectory of the at least one kite; and
a smart control system configured to automatically control the at least one kite along the flight trajectory, the smart control system including a set of sensors placed on the at least one kite and a set of ground sensors,
wherein the smart control system comprises a safety subsystem intervening in driving of the at least one kite to prevent flight collisions, the safety subsystem being configured to co-operate with an artificial view system, the artificial view system including an optical system or a microwave system, the safety system being configured to co-operate with a shearing system of the two ropes, the shearing system being configured to be managed through a watch dog.

18. A process for producing electric energy through a wind system of at least one kite that can be driven from ground, disposed to be immersed in at least one wind current, a vertical-axis wind turbine placed at ground level, the vertical-axis wind turbine including at least one arm connected through two ropes to the at least one kite, the at least one kite being configured to be driven through the vertical-axis wind turbine to rotate the at least one arm and perform conversion of wind energy into electric energy through at least one generator/motor system operating as a generator and cooperating with the vertical-axis wind turbine, the two ropes being configured both to transmit mechanical energy from and to the at least one kit and to control a flight trajectory of the at least one kite, and a smart control system configured to automatically control the at least one kite along the flight trajectory, the smart control system including a set of sensors placed on the at least one kite and a set of ground sensors, the method comprising:

a) controlling the flight trajectory of the at least one kite so that the at least one kite proceeds transversally with respect to a direction of the at least one wind current, the at least one kite tensioning the two ropes connected to the at least one arm of the vertical-axis wind turbine, rotating the at least one arm due to a dragging effect and going away from the at least one arm of the vertical-axis wind turbine making a counterweight of an energy accumulating system;

b) controlling the flight trajectory of the at least one kite so that the at least one kite proceeds along a same direction of the at least one wind current, the at least one kite tensioning the two ropes connected to the at least one arm of the wind turbine by rotating the at least one arm due to a dragging effect and approaching the at least one kite to the at least one arm of the vertical-axis wind turbine by rewinding the two ropes through winches by electric motors without lowering the counterweight of the energy accumulating system;

c) controlling the flight trajectory of the at least one kite so that the at least one kite proceeds transversally with respect to the direction of the at least one wind current, the at least one kite tensioning the two ropes connected to the at least one arm of the vertical-axis wind turbine by rotating the at least one arm due to a dragging effect, and moving away the at least one kite from the at least one arm of the vertical-axis wind turbine by unwinding the two ropes through the winches by the electric motors without lowering the counterweight of the energy accumulating system;

d) controlling the flight trajectory of the at least one kite so that the at least one kite proceeds in an opposite direction with respect to the at least one wind current without generating any braking effect for rotation of the at least one arm of the vertical-axis wind turbine, and approaching the at least one kite to the at least one arm of the vertical-axis wind turbine by lowering the counterweight of the energy accumulating system to take the at least one kite in a position starting from which it transversally proceeds with respect to the direction of the at least one wind current; and e) repeating the controlling steps a) to d).

19. A process of claim 18, wherein at least one of the controlling a), controlling b), controlling c), controlling d), or repeating e) are performed automatically through the smart control system.

* * * * *